(12) United States Patent
Frolov et al.

(10) Patent No.: US 10,301,037 B2
(45) Date of Patent: May 28, 2019

(54) METHODS FOR SITUATIONAL AWARENESS DURING FORMATION FLIGHT

(71) Applicant: SUNLIGHT PHOTONICS INC., Edison, NJ (US)

(72) Inventors: Sergey V. Frolov, New Providence, NJ (US); Michael Cyrus, Castle Rock, CO (US); Allan J. Bruce, Scotch Plains, NJ (US); John P. Moussouris, Palo Alto, CA (US)

(73) Assignee: SUNLIGHT PHOTONICS INC., Edison, NJ (US)

( * ) Notice: Subject to any disclaimer, the term of this patent is extended or adjusted under 35 U.S.C. 154(b) by 226 days.

(21) Appl. No.: 15/076,478

(22) Filed: Mar. 21, 2016

(65) Prior Publication Data

US 2017/0297736 A1    Oct. 19, 2017

Related U.S. Application Data

(63) Continuation of application No. 15/075,097, filed on Mar. 18, 2016.

(51) Int. Cl.
| | | |
|---|---|---|
| *B64D 43/02* | (2006.01) | |
| *B64D 43/00* | (2006.01) | |
| *G01F 1/32* | (2006.01) | |
| *G01F 1/46* | (2006.01) | |
| *G01F 1/68* | (2006.01) | |
| *G05D 1/10* | (2006.01) | |
| *G01P 5/00* | (2006.01) | |
| *G01P 5/165* | (2006.01) | |
| *G01P 13/02* | (2006.01) | |

(52) U.S. Cl.
CPC .............. *B64D 43/02* (2013.01); *B64D 43/00* (2013.01); *G01F 1/32* (2013.01); *G01F 1/46* (2013.01); *G01F 1/68* (2013.01); *G05D 1/104* (2013.01); *G01P 5/00* (2013.01); *G01P 5/165* (2013.01); *G01P 13/025* (2013.01)

(58) Field of Classification Search
CPC .......... B64C 13/00; B64C 15/00; G05D 1/104
USPC .................................................. 244/1 TD, 2
See application file for complete search history.

(56) References Cited

U.S. PATENT DOCUMENTS 2,649,262 A * 8/1953 Fahrney ................ F41G 7/2206
                                                    244/190
4,674,710 A * 6/1987 Rodriguez ............. G05D 1/104
                                                    244/3

(Continued)

OTHER PUBLICATIONS

U.S. Appl. No. 15/075,097, filed Mar. 18, 2016, Frolov et al.

(Continued)

*Primary Examiner* — Brian M O'Hara
*Assistant Examiner* — Keith L Dixon
(74) *Attorney, Agent, or Firm* — Moser Taboada; Alan Taboada

(57) ABSTRACT

Embodiments of methods and apparatus for close formation flight are provided herein. In some embodiments, a method for establishing situational awareness during formation flight includes exchanging transponder signals between at least two aircraft, establishing two-way communication links between the at least two aircraft, exchanging telemetry data between the at least two aircraft, and assigning the roles of a leader and a follower to the aircraft.

26 Claims, 30 Drawing Sheets

(56) References Cited

U.S. PATENT DOCUMENTS

| | | | | |
|---|---|---|---|---|
| 5,521,817 A * | 5/1996 | Burdoin | ............... | G05D 1/0027 |
| | | | | 244/190 |
| 7,529,621 B2 * | 5/2009 | Reuveni | ................ | G01S 5/0072 |
| | | | | 342/357.32 |
| 8,949,090 B2 * | 2/2015 | Whitehead | ............. | G05D 1/104 |
| | | | | 244/13 |
| 9,026,278 B2 * | 5/2015 | Dakin | .................... | G01N 21/53 |
| | | | | 356/28.5 |
| 9,108,729 B2 * | 8/2015 | Duggan | | |

OTHER PUBLICATIONS

U.S. Appl. No. 15/075,098, filed Mar. 18, 2016, Frolov et al.
U.S. Appl. No. 15/092,781, filed Apr. 7, 2016, Frolov et al.
U.S. Appl. No. 15/092,790, filed Apr. 7, 2016, Frolov et al.

\* cited by examiner

300

400

500

600

700

1400

1500

3000

3100

3200

3300

3400

4400

4500

5200

5300

5400

5500

5600

5800

5900

6000

6300

METHODS FOR SITUATIONAL AWARENESS DURING FORMATION FLIGHT

FIELD

Embodiments of the present invention generally relate to methods and apparatus for close formation flight, and in particular for flight control for organizing and maintaining close formation flight. Non-limiting examples include providing sensing capabilities and flight control algorithms for maintaining relative aircraft positions within the formation that optimize flight performance.

BACKGROUND

Formation flight can be described as an arrangement of two or more aircraft flying together in a fixed pattern as a cohesive group. Different types of aircraft regularly can be flown in formation. One example of a formation flight is aerial refueling, where a receiver aircraft flies behind and below a tanker aircraft. In some of these formations, the aircraft are sufficiently close to one another that their wakes affect the aerodynamic characteristics of each other. This situation is sometimes referred to as "close formation flight".

Close formation flight is attractive because of its potential to significantly reduce the aerodynamic drag and increase lift for the aircraft in formation. These effects in turn can lower power required for propulsion, reduce fuel consumption, and increase aircraft endurance, flight range, and payload.

While there are definite aerodynamic benefits of such formation flight, it has not been used in practice so far due to difficulties in flight control in close formation. Furthermore, the close proximity of the aircraft presents an unacceptably high risk of collision for most applications.

Close formation flight can be used for aerodynamic drag reduction, with a follower aircraft flying in the upwash generated by a leader aircraft. However, it has been very difficult for pilots on piloted aircraft and autopilots on unmanned airborne vehicles (UAV) to maintain proper positions in the formation for extended periods of time. In both cases, manned and unmanned aircraft, special automated control systems are required. Such systems must be able to determine relative locations of the aircraft and their trailing vortices to a very high degree of accuracy, in order to produce and sustain a close formation.

Wake turbulence is typically generated in the form of vortices trailing behind aircraft wing tips and other lifting surfaces. The pair of vortices generated by each aircraft is the result of lift being generated by the wings and air rotating around the wingtips from the high pressure regions at the bottom of the wing to the low pressure regions at the top of the wing.

Generally, these vortices are considered dangerous to other aircraft, particularly to those positioned directly behind within the wake turbulence. The wingtip vortices generated by a leading aircraft typically negatively affect the flight of trailing aircraft, by disrupting its aerodynamics, flight control capabilities and potentially damaging the aircraft or its cargo and injuring the crew. This makes manual flight control in close formation very difficult and challenging. As a result, conventional autopilot systems prevent close formation flight, by avoiding areas with wake turbulence.

Therefore, the inventors believe there is a need for an advanced adaptive flight control system with capabilities to provide reliable and accurate onboard flight control for aircraft in close formations. Such a system would enable multiple aircraft, both manned and unmanned, to produce and maintain close formation flight for extended time and thus achieve substantial benefits in aerodynamics performance outlined above.

Proposed solutions for such a system so far have been limited in their accuracy and efficacy. Some flight control systems are equipped to estimate the position of wingtip vortices trailing a leading aircraft, and control the flight characteristics of trailing aircraft to avoid the vortices. The position of a wingtip vortex relative to a trailing aircraft is estimated based on the flight characteristics of the leading aircraft and an estimate of the wind generated by the trailing aircraft.

Proposed close formation flight systems, as a rule, do not account for the effects of winds and drift on the wingtip vortices. The wingtip vortices, however, may move under the influence of winds and shift their position unpredictably between the leading and trailing aircraft. Because wingtip vortices cannot be directly visualized, the uncertainty in their position makes close formation flight not only challenging, but often impossible.

Older systems for formation flight control typically implemented a gradient peak-seeking approach to move the objects relative to each other to maximize or minimize a desired metric, i.e., fuel consumption. This approach uses a dither signal to determine a change in relative position to improve the metric. The change is effected, the results analyzed, and the position further updated once again using a dither signal to continually improve the metric. This gradient approach to peak-seeking may eventually position the aircraft close to the desired relative position in an ideal situation. However, such an approach is sluggish, time-consuming and unresponsive, so that in fast-changing conditions it becomes ineffective.

Some conventional formation flight control systems attempt to estimate the position of a wingtip vortex and control the position of a trailing aircraft relative to the estimated position. An inaccurate estimate of the vortex position leads to inaccurate relative positioning of the aircraft in formation. In addition, existing formation flight control systems fail to adequately account for vortex-induced aerodynamic effects acting on the aircraft.

Thus, the inventors have provided embodiments of improved apparatus, systems, and methods for close formation flight.

SUMMARY

Embodiments of methods and apparatus for close formation flight are provided herein. In some embodiments, a method for establishing situational awareness during formation flight includes exchanging transponder signals between at least two aircraft, establishing two-way communication links between the at least two aircraft, exchanging telemetry data between the at least two aircraft, and assigning the roles of a leader and a follower to the aircraft.

In some embodiments, a method for metric evaluation of a close formation between a leader aircraft and a follower aircraft includes selecting a formation flight metric for evaluation of a close formation flight, collecting data for evaluating the metric, and calculating the metric using collected data.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
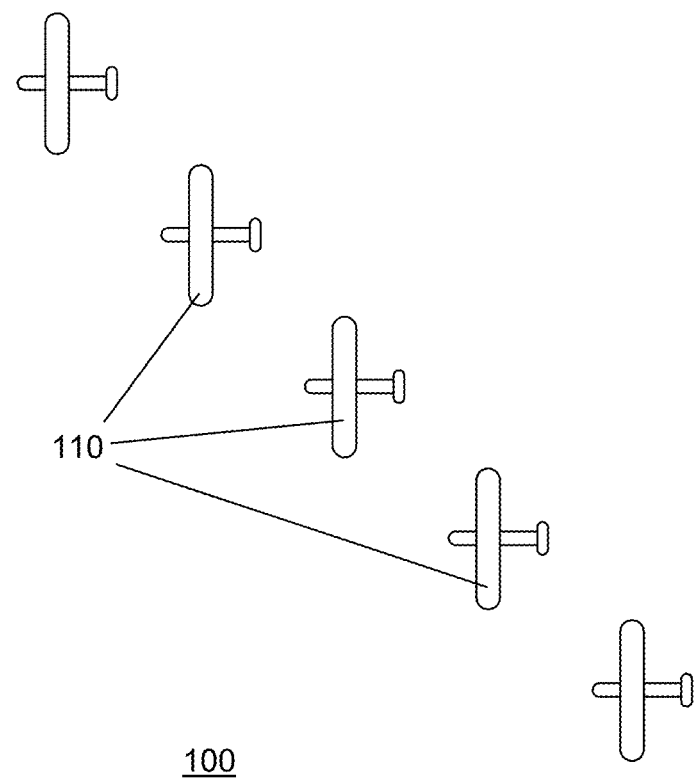
FIG. 1 depicts an exemplary close flight formation, in which several fixed-wing aircraft are staggered behind each other, in accordance with at least some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components, and/or circuits have not been described in detail, so as not to obscure the following description. Further, the embodiments disclosed are for exemplary purposes only and other embodiments may be employed in lieu of, or in combination with, the embodiments disclosed.

Figure 2:
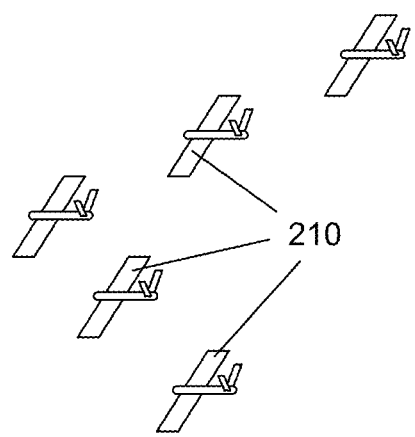
FIG. 2 depicts an exemplary close flight formation, in which multiple aircraft form a V-pattern, in accordance with at least some embodiments of the present invention.

In accordance with embodiments of the present invention, methods and apparatus for producing and maintaining a close formation flight with multiple aircraft are provided. Aircraft in close formation typically fly together as a group in close proximity of each other and at the same air speed. FIG. 1 shows for example an echelon formation 100, in which several fixed-wing aircraft 110 may be staggered behind each other. Many other formation patterns are possible: FIG. 2 shows another example of a close formation, in which multiple aircraft 210 form a V-pattern 200. The simplest close formation 300 shown in FIG. 3 can be produced by two aircraft 310 and 320, in which the left wingtip of the leader aircraft 310 and the follower aircraft 320 are aligned behind each other along the streamwise direction 315. The defining characteristic of a close formation flight in the context of this invention is that the position of a follower aircraft should overlap with the streamwise projection of a leader aircraft. Thus, the two aircraft may be physically separated by a relatively large distance 325, they may still be considered in a close formation as long as this distance is shorter than the persistence length of a wingtip vortex (or the vortex decay distance) produced by the leader and this vortex can interact with the wingtip of the follower.

Figure 3:
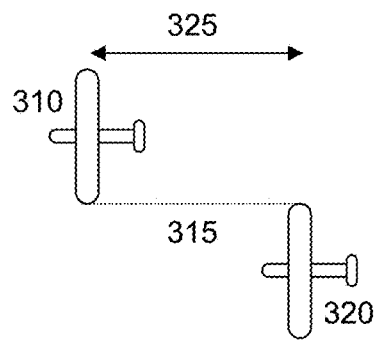
FIG. 3 depicts an exemplary close flight formation, in which two aircraft have one wing each aligned with respect to a wing of the other along the streamwise direction, in accordance with at least some embodiments of the present invention.
Figure 4:
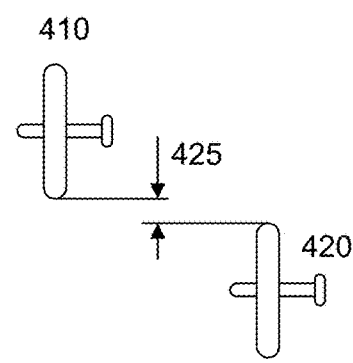
FIG. 4 depicts a spanwise separation along the Y axis in a dual formation flight in accordance with at least some embodiments of the present invention.
Figure 5:
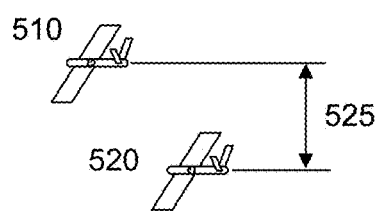
FIG. 5 depicts a vertical separation along the Z axis in a dual formation flight in accordance with at least some embodiments of the present invention.

The alignment between aircraft in a close formation may be characterized by their tip-to-tip separation along the three axes (directions): X axis—the streamwise direction, Y axis—the spanwise direction and Z axis—the vertical direction. FIG. 3 illustrates streamwise separation (distance 325) along the X axis. FIG. 4 shows spanwise separation 425 along the Y axis between an aircraft 410 and an aircraft 420 in a dual formation 400. Similarly, FIG. 5 shows vertical separation 525 along the Z axis between an aircraft 510 and an aircraft 520 in a dual formation 500. While the X distance in a close formation may be relatively large (ranging between 1 and 100 wingspans), the Y and Z distances should be relatively small, i.e., less than a single wing span or a fraction of a wingspan.

Figure 6:
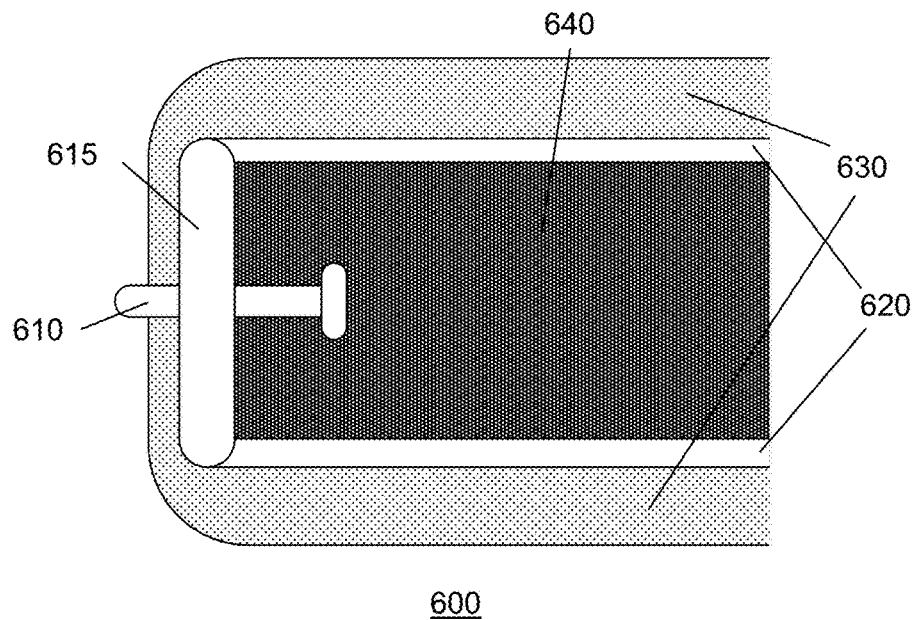
FIG. 6 shows a horseshoe vortex model used to describe the wake behind a fixed-wing aircraft in accordance with at least some embodiments of the present invention.

The tolerance to misalignment between aircraft in a close formation is determined by the characteristics of wingtip vortices. Different models have been used to describe and visualize these vortices. FIG. 6 shows a horseshoe vortex model 600 typically used to describe the wake behind a fixed-wing aircraft. In accordance with this model, plane 610 with wing 615 produces a pair of vortices 620 originating from the wingtips. On the outside of vortices 620 there are areas of upwash 630, whereas on the inside of vortices 620 there is an area of downwash 640. Upwash 630 may reduce the drag and increase the lift of the follower aircraft. However, downwash 640 may do the opposite—reduce the lift and increase the drag. In this model we neglect the vortices produced by other surfaces on the aircraft, e.g., on the tail or fuselage. In addition, other more complex computer models may be used to describe vortices, such as for example a vortex lattice method, which may be more accurate than the horseshoe vortex model.

Figure 10:
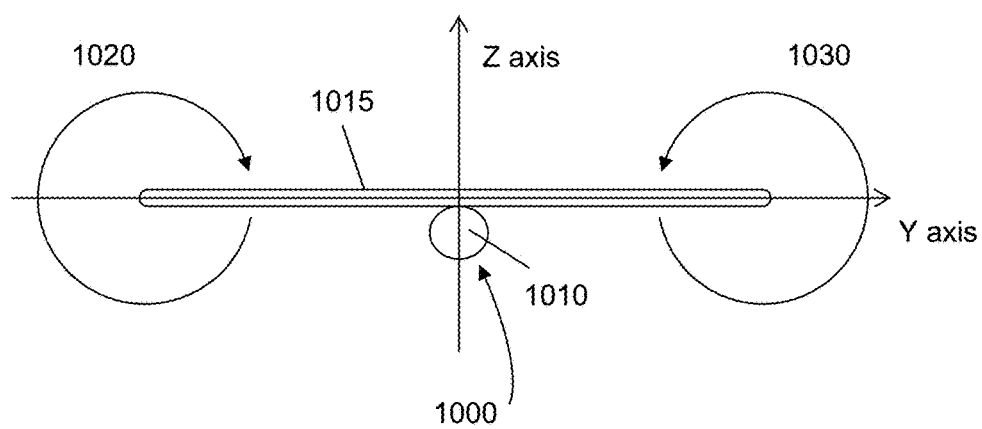
FIG. 10 shows the vortices of FIG. 6 in a different view plane.

FIG. 10 shows these vortices in a different view plane 1000. Wing 1015 of aircraft 1010 produces two wingtip vortices 1020 and 1030, where the right-hand vortex has a clockwise rotation and the left-hand vortex has a counter-clockwise rotation. As result, the air on the outer side of the vortices has an upward velocity component (upwash) and the air on the inside of the vortices has a downward velocity component (downwash).

Figure 11:
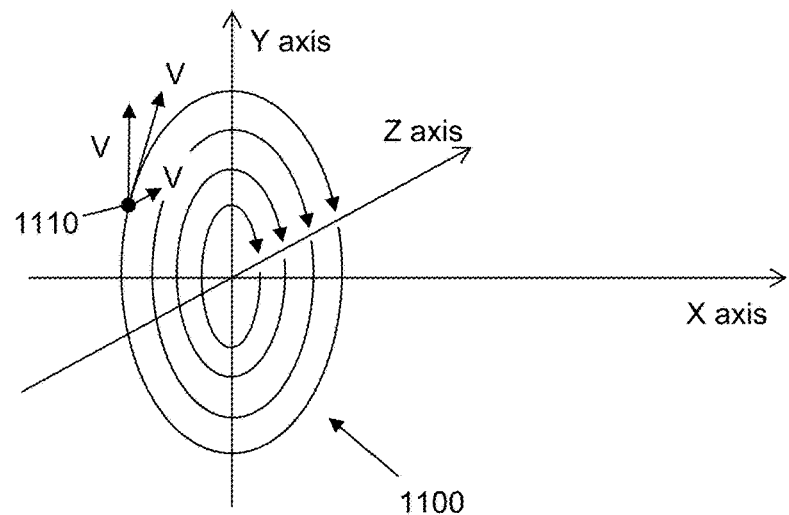
FIG. 11 shows a single vortex in the Y-Z plane propagating along the X axis (flight direction).

FIG. 11 shows a vortex field 1100 having a single vortex in the Y-Z plane propagating along the X axis (flight direction). Particles in this vortex are subjected to circular motion around the vortex core at the center of the coordinate system of FIG. 11. For example, particle 1110 has a tangential velocity V with corresponding $V_y$ and $V_z$ components along the Y and Z axis, respectively.

Figure 12:
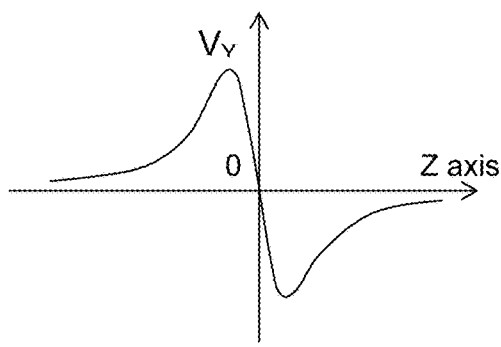
FIGS. 12-13 respectively depict the variation of magnitudes of vortex tangential velocity components $V_y$ and $V_z$ for a wingtip vortex as a function of position in the Y-Z plane plotted in the reference frame shown in FIG. 10.
Figure 13:
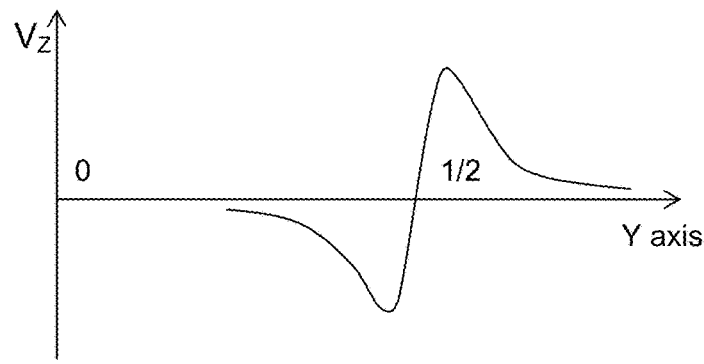

If the vortex tangential velocity components $V_y$ and $V_z$ for vortex 1030 (depicted in FIG. 10) are plotted in the reference frame of view plane 1000 of aircraft 1010, their magnitudes (plotted on the vertical axes) would vary as functions of position in the Y-Z plane as shown in FIGS. 12 and 13, respectively. For example, FIG. 12 depicts a plot 1200 of the magnitude of vortex tangential velocity component $V_y$ (on the vertical axis) as a function of position along the Z axis. Similarly, FIG. 13 depicts a plot 1300 of the magnitude of vortex tangential velocity component $V_Z$ (on the vertical axis) as a function of position along the Y axis. Both components are close to zero near the vortex core (i.e., the vortex core center) and have opposite signs on opposite sides of the core. The vortex core position in this coordinate frame is approximately at y=½ (one-half of a wingspan) and z=0.

Figure 7:
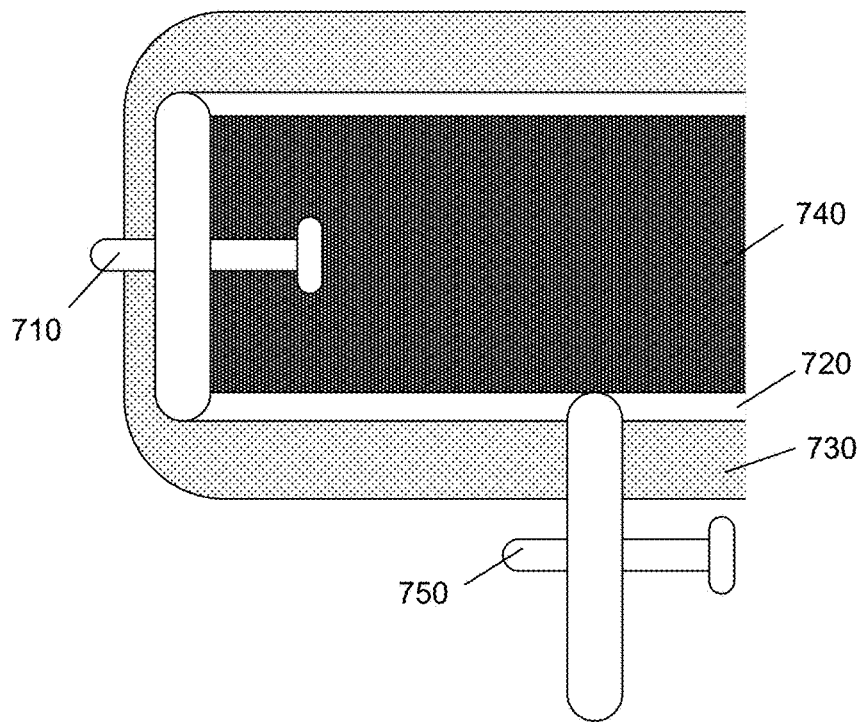
FIG. 7 shows a dual aircraft close formation in accordance with at least some embodiments of the present invention.

FIG. 7 shows a dual aircraft close formation 700 composed of two aircraft 710 and 750. The leader aircraft 710 generates vortices 720 and areas of upwash 730 and downwash 740. In order to achieve the most beneficial formation flight configuration, aircraft 750 should maximize the overlap of its wing with the upwash area 730 and minimize the overlap with the downwash area 740. The aircraft 710 and 750 may be of the same model type, but this need not be so. As such, the aircraft 710 and 750 may have the same vortex, upwash and downwash generating characteristics, or they may be dissimilar with respect to any or all of those characteristics.

Figure 8:
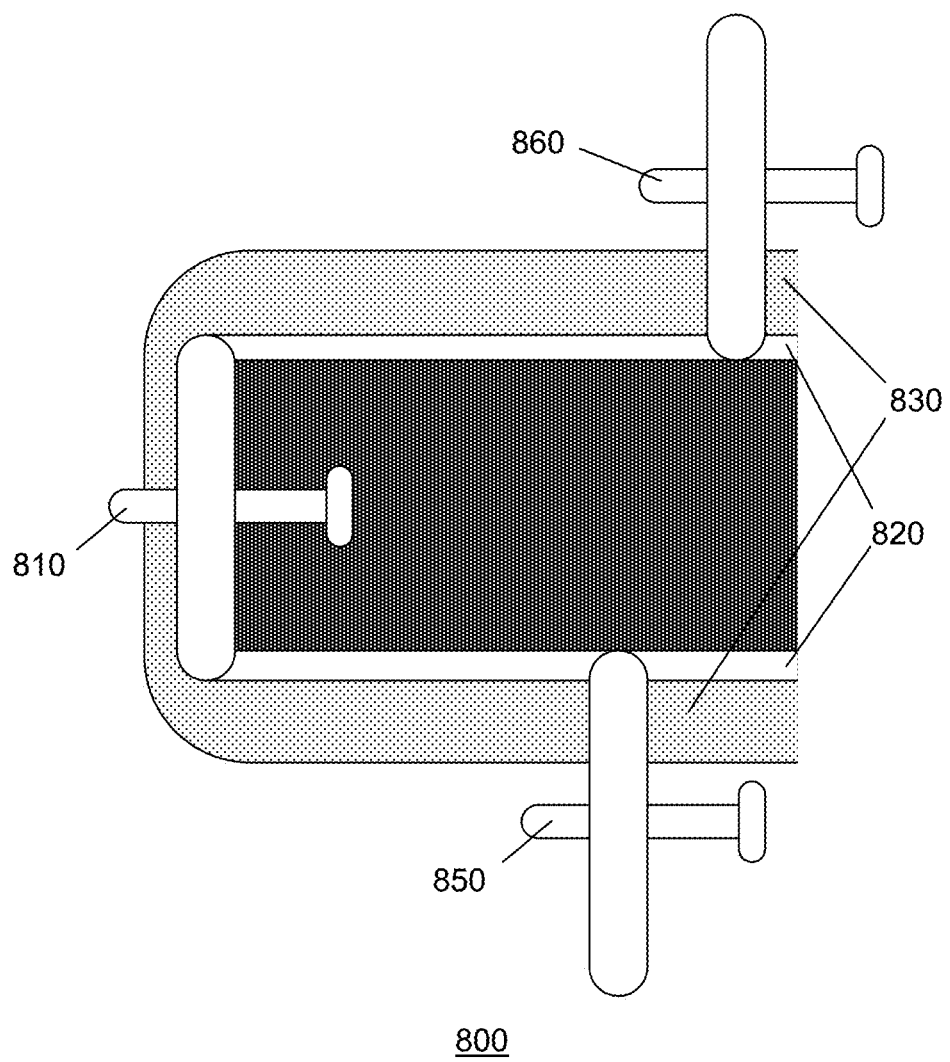
FIG. 8 shows a triple aircraft close formation in accordance with at least some embodiments of the present invention.

Similarly, FIG. 8 shows a triple aircraft close formation 800 composed of three aircraft 810, 850, and 860. Because the leader aircraft 810 generates wingtip vortices 820 and upwash areas 830 on both sides of the wing, two follower aircraft 850 and 860 may take aerodynamically beneficial positions behind the leader 810. In this case they may form a V-shaped close formation, in which the X distance between the leader and the followers is in the range of a fraction of a wingspan to few wingspans (less than 10). However, an extended close formation is possible too, where at least one of the follower aircraft is separated by an X distance of more than several wingspans (e.g., more than 10 and less than 100).

Figure 9:
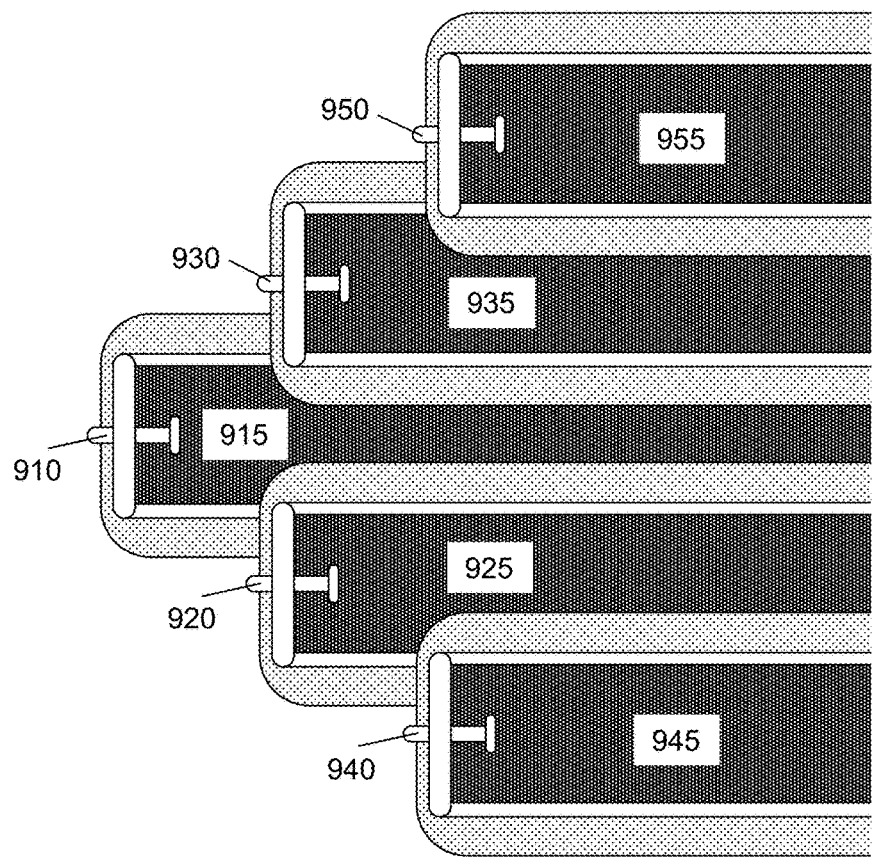
FIG. 9 shows a larger close formation in accordance with at least some embodiments of the present invention.

Larger close formation may comprise a greater number of aircraft, as shown in FIG. 9. Close formation 900 is a V-formation, comprising at least 5 aircraft—910, 920, 930, 940, and 950 with corresponding wake areas 915, 925, 935, 945, and 955 (each wake area having corresponding upwash and downwash areas as discussed above). In this case, some aircraft may play the roles of both leaders and followers, e.g., aircraft 920 and 930 (both of which follow aircraft 910, and both of which lead other aircraft following them). The most beneficial position for each aircraft in this formation is also determined by the best overlap of the follower's wing area with the leader wake's upwash area. This typically implies a close tip-to-tip positioning in the Y-Z plane between any given leader-follower pair, i.e., a minimal separation in the Y and Z directions. The above description is valid for close formations in combination with different types of fixed wing aircraft, so that different types of aircraft may fly in the same formation and experience the same or similar aerodynamic benefits.

Figure 14:
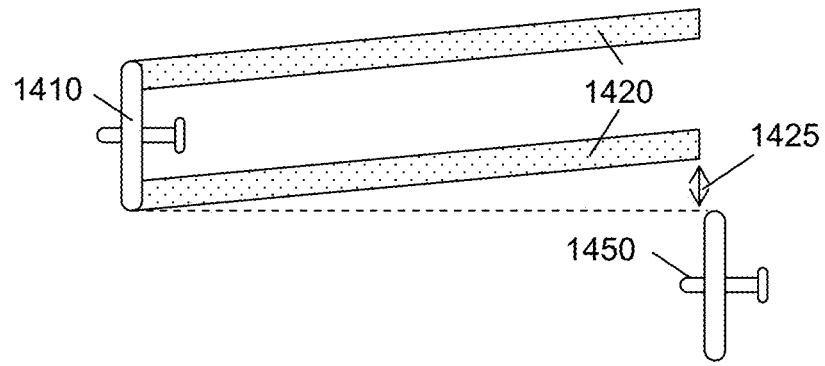
FIG. 14 depicts variations of wingtip vortices resulting in a shift in expected position of the vortices

The wingtip vortices usually do not stay in the same place, and instead change their position as shown in formation 1400 in FIG. 14. In formation 1400, the leader aircraft 1410 may produce a pair of vortices 1420, which subsequently will be subjected to interactions between themselves, interactions with other vortices, atmospheric turbulence, winds, drafts, and the like. As a result, vortices 1420 may experience a shift from their expected position by a walk-off distance 1425, causing follower aircraft 1450 to miss the vortices and thus fail to produce a close formation. In addition, the size of the vortices may change too. The uncertainty in the vortex position and size may be reduced by reducing the X distance between the leader and the follower. However, this also significantly increases the risk of collision, reduces alignment tolerances between aircraft in the formation and makes formation flight control much more difficult.

Instead of estimating vortex positions from an indirect analysis of various data, a better approach is to sense the vortices directly and base formation flight control procedures on the real measurements of the vortex positions, rather than their estimates and predictions.

Figure 15:
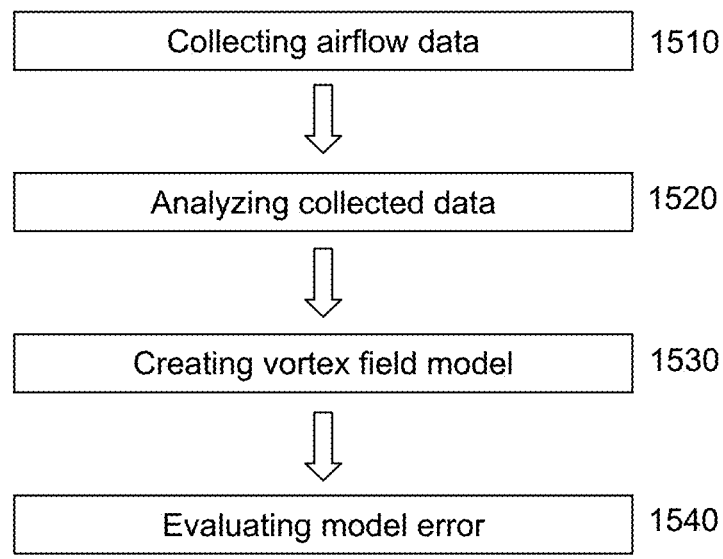
FIG. 15 shows a method of vortex sensing in accordance with at least some embodiments of the present invention.

In accordance with embodiments of the present invention, a method 1500 of vortex sensing (shown in FIG. 15) is provided in which the following may be implemented by the follower aircraft, either manually, automatically or both: measuring and collecting data at 1510 characterizing airflow near the aircraft, analyzing the collected data at 1520, creating a computer model of a vortex field at 1530, and evaluation of errors or differences between the model and the real vortex field at 1540. These processes may be repeated until the value of error is below the acceptable limit or within the measurement uncertainty. The resulting model produces a set of static and dynamic parameters that simulate the airflow vector velocity field and its dynamic behavior. In general, the model may simulate difference airflow patterns and behaviors. In particular, it may simulate a single vortex, multiple vortices and vortex sheets. A simpler model (e.g., a single vortex model) may be less precise than a more complex (e.g., a vortex sheet model), but easier to process and faster to implement. As a result, a horseshoe vortex model shown in FIG. 6 or even a simpler model of a single wingtip vortex may be well suited for the purposes of in-flight vortex sensing, simulation and analysis.

The computer vortex model may produce a vortex field similar to vortex field 1100 in FIG. 11. Instead of a complete vortex model, a simplified vortex model may be produced, in which only the vortex core and particularly its center position (an eye position) is characterized. The relative position of a vortex eye may be the primary parameter affecting the flight control during the close formation flight. In some situations, a complete or even partial vortex model may be difficult to produce due to insufficient or noisy airflow data. However, it is still may be possible to provide sufficient information about the relative vortex eye location, e.g., whether it is on the starboard or port side of the plane or whether it is above or below the plane.

Furthermore, additional processes may include one or more of varying Y and Z positions of the aircraft (either leader or follower), filtering and averaging airflow data provided by the measurements, using Kalman filters for data analysis and vortex model building, using complementary data to create and refine the vortex model (e.g., data provided by other aircraft in the same formation), and the like. Changing the aircraft position in the direction suggested by the vortex model may bring the aircraft closer to the vortex eye, improve data collection and analysis due to higher signal-to-noise ratio and improve the vortex model. Different vortex models may be used in different relative positions between the aircraft and the vortex, e.g., a simpler less accurate model may be used when the separation between the vortex core and the aircraft is relatively large (e.g., larger than half of a wingspan).

Figure 16:
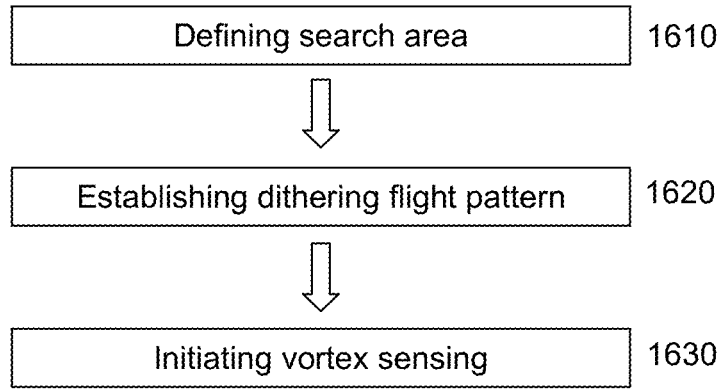
FIG. 16 shows a method for airflow vortex searching in accordance with at least some embodiments of the present invention.

In accordance with embodiments of the present invention, a method 1600 for airflow vortex searching (shown in FIG. 16) is provided in which the following may be implemented by an aircraft (e.g., the follower aircraft), either manually, automatically or both: defining the target search area in XYZ space around the aircraft at 1610, establishing a dithering flight pattern at 1620, in which the aircraft may systematically fly through a grid of different X, Y, and Z coordinates, and continuous vortex sensing at 1630 until sufficient data is collected to create a robust vortex model. A robust vortex model may be defined as a model produced by a set of real-time measurements, in which at least some of its characteristic parameters (i.e., vortex core diameter, position, strength, etc.) have converged to stable values. A flight control system may specify the accuracy or precision required for vortex identification, which then would determine the time when the vortex search may be considered completed. For example, positional accuracy in the Y and Z directions may be specified as 5% of the wingspan. Additional processes may include one or more of communicating and exchanging telemetry data with other aircraft in the vicinity (particularly with the leader aircraft), using global positioning (GPS) data for narrowing the search area, using visual and other complimentary data for narrowing the search area, using neural network and deep learning algorithms for vortex patterns recognition, and the like. The search area in the method may be limited to the scan within a YZ coordinate plane at a fixed X position with respect to the leader aircraft.

Figure 17:
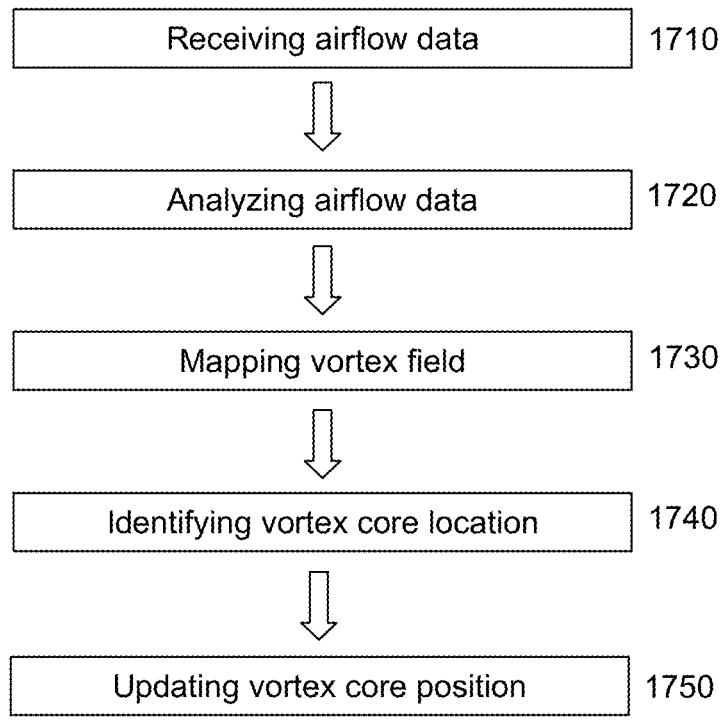
FIG. 17 shows a method of vortex tracking in accordance with at least some embodiments of the present invention.

In accordance with embodiments of the present invention, a method 1700 of vortex tracking (shown in FIG. 17) is provided in which the following may be implemented by the follower aircraft, either manually, automatically or both: receiving continuously updated data of the airflow at 1710, analyzing the airflow data at 1720, mapping at least a part of the vortex field at 1730, identifying the location of a vortex core at 1740 (particularly its center), and continuously or intermittently updating the position of the vortex core with respect to the aircraft at 1750. Additional processes may include one or more of filtering and averaging airflow data provided by the measurements, using Kalman filters for data analysis and vortex model building, analysis and identification of the vortex core, using complementary data to create and refine the vortex model (e.g., data provided by other aircraft in the same formation), and the like.

In accordance with embodiments of the present invention, a method of multiple vortex tracking by an aircraft is provided in which the following may be implemented by the follower aircraft, either manually, automatically or both: receiving continuously updated data of the airflow around the aircraft (e.g., at 1710) using onboard sensors, analyzing the received data creating computer vortex models (e.g., at 1720), mapping the vortex field, subdividing the mapped vortex field into different vortex regions (e.g, at 1730), identifying the location of respective vortex cores and particularly their centers, and continuously or intermittently updating the positions of the vortex cores with respect to the aircraft. Additional processes may include one or more of filtering and averaging airflow data provided by the measurements, using Kalman filters for data analysis and vortex model building, analysis and identification of the vortex cores, using neural network and deep learning algorithms for vortex pattern recognition, using complementary data to create and refine the vortex models (e.g., data provided by other aircraft in the same formation), and the like.

Figure 18:
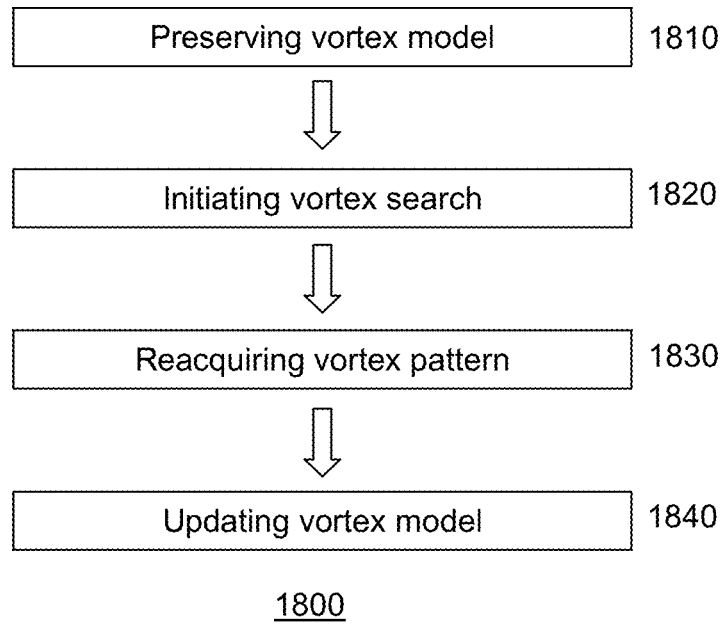
FIG. 18 shows a method of vortex recovery in accordance with at least some embodiments of the present invention.

In accordance with embodiments of the present invention, a method 1800 of vortex recovery (shown in FIG. 18) is provided in which the following may be implemented by the follower aircraft, either manually, automatically or both: preserving the computer model of the vortex field acquired by the aircraft at 1810, initiating the vortex search at 1820, reacquiring the vortex pattern at 1830, and updating the computer model of the vortex and providing continuous updates for the vortex characteristics at 1840. Additional processes may include one or more of using neural network processing and deep learning algorithms for vortex pattern recognition, using complementary data to create and refine the vortex models (e.g., data provided by other aircraft in the same formation), and the like.

Figure 19:
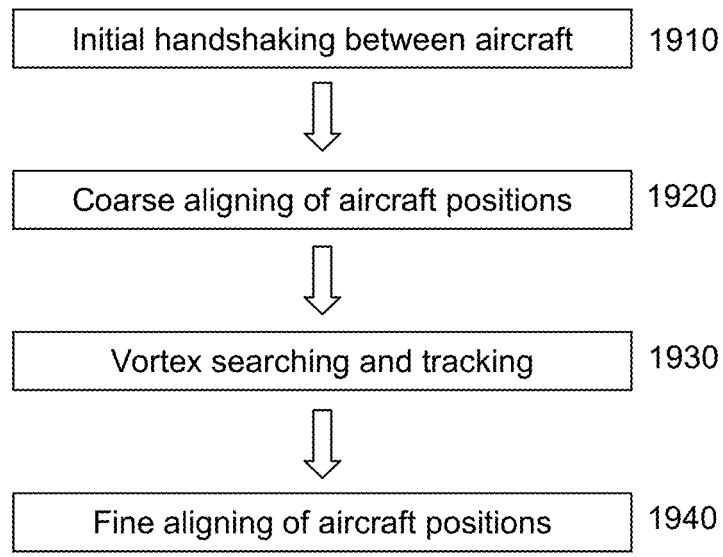
FIG. 19 shows a method of forming a close formation for a group flight between two aircraft in accordance with at least some embodiments of the present invention.

In accordance with embodiments of the present invention, a method 1900 of forming a close formation for a group flight between two aircraft (shown in FIG. 19) is provided in which the following may be implemented by the two aircraft, either manually, automatically or both: initial handshaking between the aircraft at 1910, coarse aligning of their relative positions at 1920, vortex searching and tracking at 1930, and fine aligning of aircraft positions at 1940. Additional processes may include one or more of establishing communication channel(s) and data exchange network(s) between the aircraft, choosing one or more formation flight metrics and evaluating its parameters, optimizing relative aircraft positions to maximize formation flight benefits by maximizing the metric parameters, and the like.

Figure 20:
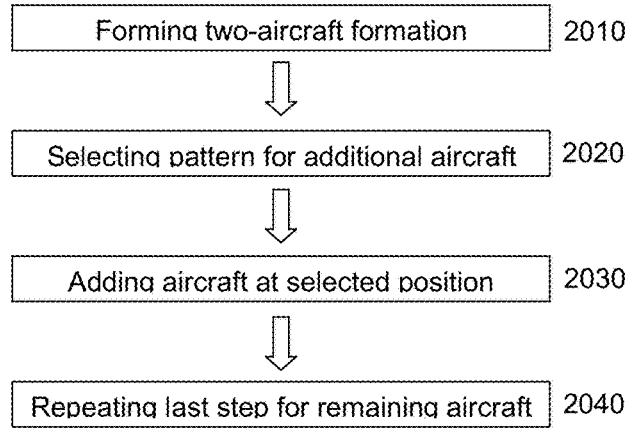
FIG. 20 shows a method of forming a close formation for a group flight between more than two aircraft in accordance with at least some embodiments of the present invention.

In accordance with embodiments of the present invention, a method 2000 of forming a close formation for a group flight between more than two aircraft (shown in FIG. 20) is provided in which the following may be implemented by the aircraft, either manually, automatically or both: forming a two-aircraft formation at 2010 (as outlined above), selecting a formation pattern for additional aircraft at 2020, adding at least one additional aircraft to the formation at the selected positions at 2030. Optionally, at 2040, 2030 may be repeated for any remaining aircraft at. Adding at least one additional aircraft to the formation (e.g., a first formation) at the selected positions may include adding one additional aircraft to the formation (e.g., the first formation) at the selected position, or adding another formation (e.g., a second formation) to the formation (e.g., the first formation) at the selected position. The latter scenario may include cases when a leader in the second formation becomes a follower in the first formation and vice versa.

In accordance with embodiments of the present invention, a method of adding an additional aircraft to an existing aircraft formation (similar to method 1900 in FIG. 19) is provided in which the following may be implemented by the additional aircraft, either manually, automatically or both: establishing an initial handshake between aircraft in the existing formation and the additional aircraft, coarse aligning the position of the additional aircraft, vortex searching and tracking by the additional aircraft, and fine aligning of the additional aircraft with respect to other aircraft. Additional processes may include one or more of establishing communication channel(s) and data exchange network(s) between the aircraft, choosing formation flight metric and evaluating its parameters, optimizing relative aircraft positions to maximize formation flight benefits by maximizing the metric parameters, and the like.

Figure 21:
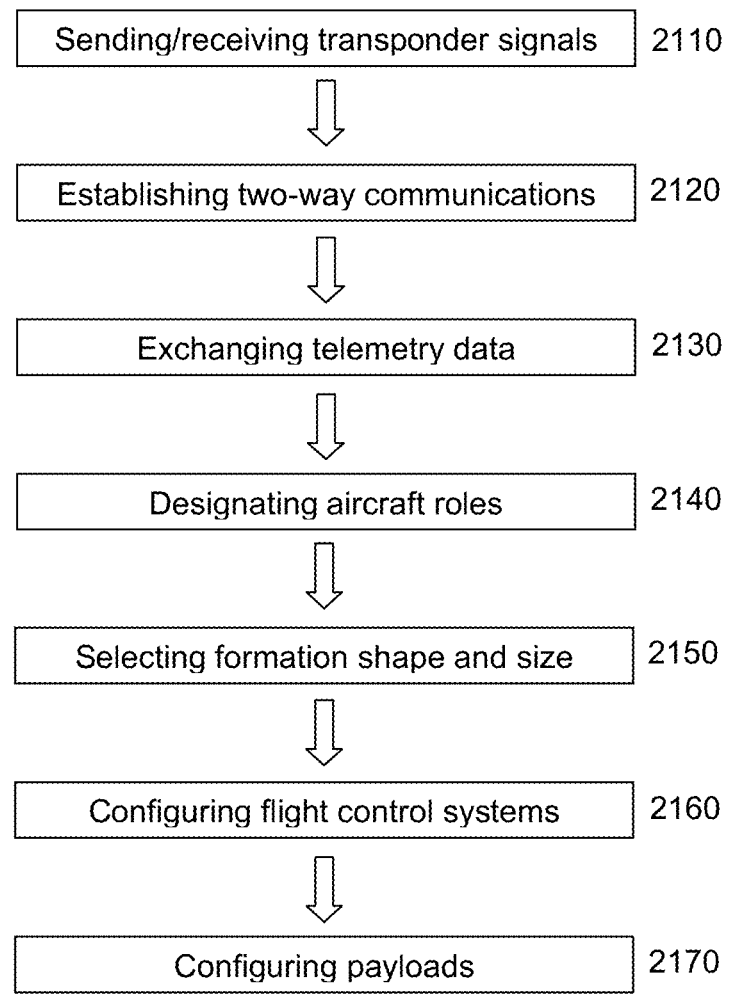
FIG. 21 shows a method of preliminary and initial handshaking between at least two aircraft in accordance with at least some embodiments of the present invention.

In accordance with embodiments of the present invention, a method 2100 of preliminary and initial handshaking between at least two aircraft (shown in FIG. 21) is provided in which the following may be implemented by the two aircraft, either manually, automatically or both: sending and receiving transponder signals by each aircraft at 2110, establishing two-way communication links between aircraft at 2120, and exchanging telemetry data at 2130. The telemetry data may include information about such flight parameters as the position, airspeed, pitch angle, yaw angle, thrust, power consumption and acceleration of an aircraft, status and/or operating performance (e.g. power consumption) of on-board subsystems, such as propulsion systems, power systems, flight control systems, payload systems and other systems, data from various on-board sensors including airflow data near the aircraft and so on. Additional processes may include one or more of designating the roles of leaders and followers to specific aircraft at 2140, selecting the pattern, shape and size for a formation at 2150, configuring flight control systems for a formation flight at 2160, and configuring payload for formation flight on at least one aircraft at 2170. The same aircraft in a formation may undergo multiple handshaking steps. For example, it is possible for the same aircraft to be both a leader and a follower, in which case this aircraft may first go through the handshaking as a follower and subsequently as a leader aircraft do different handshaking with other aircraft (e.g., additional aircraft joining the formation).

In accordance with embodiments of the present invention, a method of networking between at least two aircraft is provided in which the following may be implemented by the two aircraft, either manually, automatically or both: establishing a communication network among the aircraft, exchanging telemetry data, and exchanging flight plans and commands. Additional processes may include one or more of selecting networking channel(s) and protocol(s), establishing a peer-to-peer network, establishing an ad-hoc network, establishing a network using radio frequency (RF) communication channels, establishing a network using free space optics, selecting and maintaining optimum distances between aircraft for reliable communication links, extending a network to elements outside of a formation (including other aircraft, ground-based network nodes (e.g., ground stations) and space-based network nodes (e.g., communication satellites)), and the like. The formation networking may be based on either mesh or point-to-point communication links. Different aircraft may play either different or similar roles in the network. In the former case, at least one aircraft may be a designated network controller, while in the latter case all aircraft equally share the tasks of managing network traffic.

Figure 22:
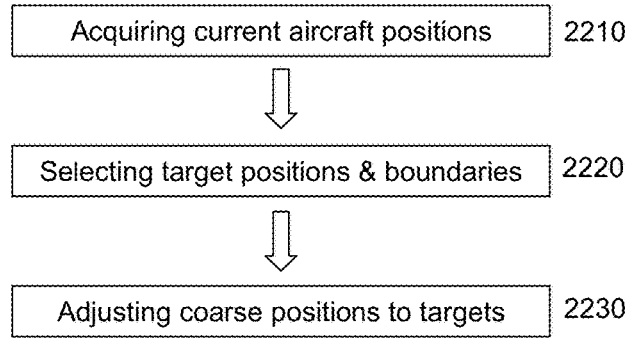
FIG. 22 shows a method of coarse alignment between two aircraft for a close formation flight in accordance with at least some embodiments of the present invention.

In accordance with embodiments of the present invention, a method 2200 of coarse alignment between two aircraft for a close formation flight (shown in FIG. 22) is provided in which the following may be implemented by the two aircraft, either manually, automatically or both: acquiring the current relative positions of the aircraft at 2210, selecting target positions in the formation for each aircraft and their boundaries at 2220, and adjusting coarse positions of each aircraft until they are within the target boundaries at 2230. The target position may correspond to approximate expected or estimated position of a wingtip vortex behind a leader aircraft. Additional processes may include one or more of exchanging telemetry data between the aircraft, utilizing direct links between the aircraft (e.g., network links), utilizing indirect links between aircraft (e.g., via ground stations and satellites), using visual acquisition, recognition and analysis to obtain relative positioning data (e.g., using video cameras or thermal imaging), using beacon signals to facilitate coarse alignment, using triangulation to analyze data and calculate relative positions, and the like.

Figure 23:
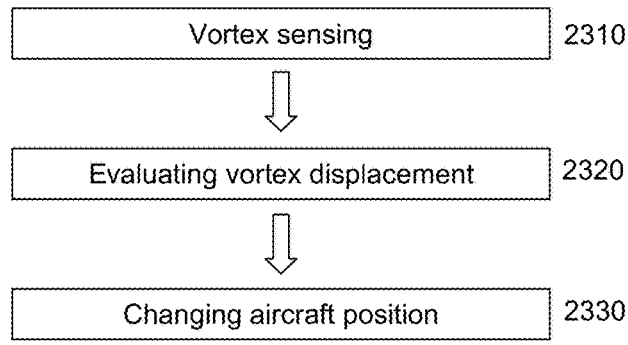
FIG. 23 shows a method of fine aligning between two aircraft for a close formation flight in accordance with at least some embodiments of the present invention.

In accordance with embodiments of the present invention, a method 2300 of fine aligning between two aircraft for a close formation flight (shown in FIG. 23) is provided in which the following may be implemented by the follower aircraft, either manually, automatically or both: vortex sensing at 2310, evaluating the displacement of a vortex core with respect to the optimal position at 2320, and changing the aircraft position at 2330. The method 2300 may be repeated until the desired displacement is achieved (e.g., zero displacement or displacement within a predetermined tolerance of zero). Additional processes may include one or more of vortex searching, vortex tracking, evaluating the optimum position of the vortex core with respect to the aircraft, choosing a formation metric, evaluating and optimizing the metric, and the like. Changing the aircraft position at 2330 may include changing the transverse, streamwise or X position, changing the lateral, spanwise or Y position, and changing the vertical or Z position of the follower aircraft with respect to the vortex core. Furthermore, a leader aircraft may facilitate the process of fine alignment between the leader and the follower by marking the approximate positions of its vortices, which in turn may be achieved by mechanical means (e.g., producing visual aids such as small particulates behind wingtips), electrical means (e.g., by ionizing air and emitting ionized gas at the wingtips), optical means (e.g., by emitting optical beams along the streamwise direction behind the wingtips), radio means (e.g. by emitting directional radio waves) and audio means (e.g., by emitting concentrated sound (or infra/ultra sound) waves along the streamwise direction behind the wingtips).

In accordance with embodiments of the present invention, a method of changing a formation flight pattern with at least one leader and one follower aircraft is provided in which the following may implemented by at least two aircraft: reassigning the roles of one former leader to become a follower and one former follower to become a leader, updating target positions for the respective aircraft, initiate position change in the formation by changing to coarse positions by the respective aircraft and perform fine aligning of the respective positions of each aircraft in the formation.

In accordance with embodiments of the present invention, a method of metric evaluation of a close formation is provided in which the following may be implemented by at least one follower aircraft, either manually, automatically or both: selecting an appropriate metric for evaluation of the flight formation (such as lift, drag, thrust, power consumption, fuel consumption, electrical consumption, electrical power supply current and voltage, angle of attack, rate of descent or ascent, air speed, rolling moment, yaw moment, pitching moment, vortex core displacement and others), collecting data for evaluating the metric, and calculating the metric using collected data. These processes may be used repeatedly and continuously during the formation flight to evaluate the conditions of a single pair formation (e.g., alignment between a leader and a follower) or of a larger formation with multiple leader-follower pairs. Additional processes may include one or more of measuring airflow characteristics around the follower aircraft, exchanging data (measured and calculated) between the aircraft, receiving additional data from other aircraft, analyzing collected data, using averaging and filtering for analyzing the data, using Kalman filters for data analysis and metric calculations, providing data used in calculations to other aircraft, providing the calculated metric to other aircraft in the formation, using several different metric parameters, switching between different metric parameters used for evaluation of the flight formation, and the like. Furthermore, in a formation with multiple followers a combined metric may be used to evaluate the formation as a whole, in which metric parameters from different followers are collected and analyzed, and a single figure of merit is produced to characterize the status of the formation as a whole. The combined formation flight metric may be the total propulsion power of an aircraft fleet in the formation, the total aerodynamic drag, the net fuel consumption of the fleet as a whole, the sum of quadrature deviations from the optimum relative vortex positions in the formation and others.

Figure 24:
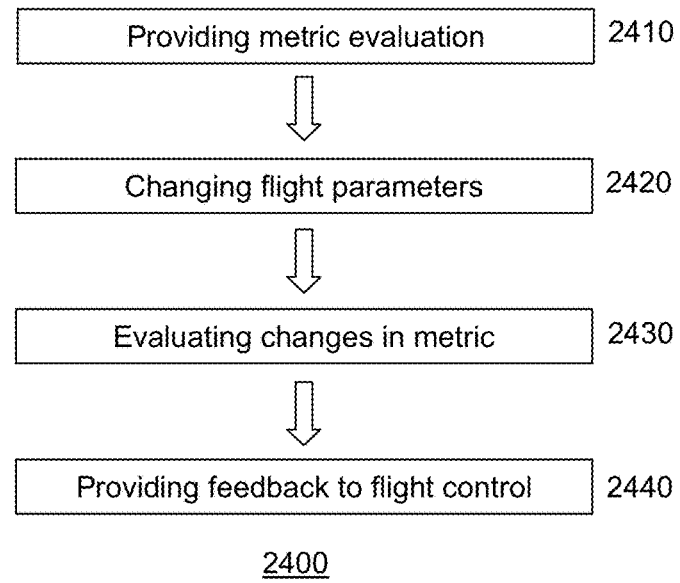
FIG. 24 shows a method of close formation optimization in accordance with at least some embodiments of the present invention.

In accordance with embodiments of the present invention, a method 2400 of close formation optimization (shown in FIG. 24) is provided in which the following may be implemented by at least one follower aircraft, either manually, automatically or both: providing the results of the metric evaluation at 2410, changing flight parameters at 2420, evaluating changes in the metric at 2430, and providing feedback to flight control at 2440, for example, to continue to change the flight parameters if the metric changes are positive and reversing the change if the metric changes are negative. The flight parameters that may be changed during the formation optimization include, but are not limited to: position, airspeed, pitch angle, roll angle, yaw angle, acceleration, thrust, power consumption, payload power consumption, and others. For example, the aircraft altitude may be continuously varied in a search of a minimum power consumption position in the vertical direction. Several flight parameters may be varied at the same time or sequentially. Additional processes may include one or more of providing flight parameter changes to other aircraft in the formation, coordinating flight parameter changes with actions of other aircraft (e.g., synchronizing or conversely alternating flight parameter scans between different aircraft), evaluating calculation errors and terminating the optimization process when effected changes are smaller than the calculated errors, and the like. For example, two follower aircraft in a formation may vary their positions synchronously without affecting each other evaluation of a formation flight metric corresponding to their respective leader-follower pairs. As a result, the combined formation flight metric may be evaluated and optimized faster than if they were varying their positions in sequence.

The method 2400 may also include using a deep learning computer algorithm for data processing and analysis during the formation flight optimization, which may recognize and record optimum follower aircraft positions with respect to either leader positions or vortex core positions in different flight conditions (i.e., flight speeds, altitudes, crosswinds, aircraft size, formation configuration, etc.). Once this position is learned, it can be quickly replicated with precision by the automatic flight control system after a particular vortex pattern is identified by the deep learning algorithm. As a result, the formation flight optimization can be dramatically faster.

In accordance with embodiments of the present invention, a method of maintaining a close formation is provided in which the following may be implemented by at least one follower aircraft, either manually, automatically or both: tracking a vortex produced by a leader aircraft, and adjusting the aircraft position with respect to the vortex core until the optimum vortex position is achieved. The optimum position may be defined in a number of ways, including but not limited to: a position of an aircraft relative to a vortex center or a leader aircraft that maximizes a given formation metric (e.g., maximizes the aerodynamic drag reduction), a position at which at which formation flight control inputs are zero (e.g., vortex eye sensor measurements are zero or close to zero as described below), a position predicted by a computer vortex model as being optimal for a given formation flight and so on. Of course, the optimum position can be reliably maintained only within the measurement uncertainties and accuracy of on-board sensors, and capabilities and precision of flight control systems. These processes may be repeated continuously or intermittently by one or more aircraft in the formation. Changes in the relative position of vortices may be induced by the motion of leader aircraft and atmospheric air movements. Continuous vortex tracking allows follower aircraft to maintain a persistent lock on the vortex position, to implement timely adjustments in the aircraft position and thus maintain an efficient close formation.

In accordance with embodiments of the present invention, another method of maintaining a close formation is provided in which the following may be implemented by both a leader and a follower aircraft, either manually, automatically or both: tracking the leader aircraft wingtip vortex by the follower aircraft, transmitting data containing relative position of the vortex by the follower aircraft to the leader aircraft, and adjusting the leader aircraft position with respect to the follower aircraft until the optimum vortex position is achieved. The data transmission between the follower and the leader aircraft may be done via a formation network or a dedicated communication link between the two aircraft.

In accordance with embodiments of the present invention, a method of recovering a close formation is provided in which the following may be implemented by either a leader or a follower aircraft, either manually, automatically or both: alerting other aircraft in the formation of a broken formation between at least one leader and one follower, initiating vortex recovery by the follower aircraft, and maintaining close formation between other aircraft in the formation. The leader aircraft may also assist in the vortex recovery by one or more of complimentary adjustments in its relative position to the follower aircraft and provision of additional positioning telemetry data to the follower aircraft. The positioning tolerances and relevant formation metrics may be relaxed for other aircraft in the formation during the formation recovery period. The aircraft assignments in the formation do not change in the formation recovery, i.e., their relative positions before and after recovery remain the same.

In accordance with embodiments of the present invention, a method of changing a close formation is provided in which the following may be implemented by either a leader or a follower aircraft, either manually, automatically or both: disengaging a close formation alignment between at least one leader and a follower aircraft, reassigning aircraft to new positions in the formation, and producing a new formation based on the new position assignments. Disengaging a close formation alignment between at least one leader and a follower aircraft may include terminating vortex tracking by the follower aircraft and entering a new flight path for either the follower aircraft, the leader aircraft, or both.

Figure 25:
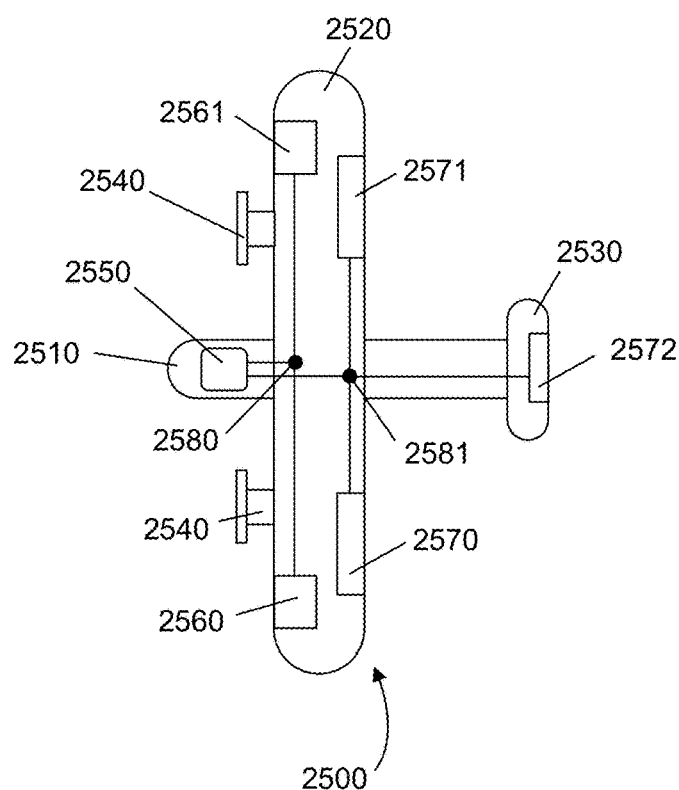
FIG. 25 shows an exemplary fixed-wing aircraft configurable for a close formation flight in accordance with at least some embodiments of the present invention.

In accordance with embodiments of the present invention, the close formation methods outlined above may be implemented by the flight control systems internal and external to the aircraft and aircraft formation as a whole. FIG. 25 shows an exemplary fixed-wing aircraft 2500 configurable for a close formation flight, which comprises a fuselage 2510, a wing 2520, a tail 2530, and a propulsion system 2540. Other aircraft configurations may be used, in which additional elements may be present or some elements may be missing, but at least one wing or a wing-like surface is present. These configurations include but not limited to, for example, planes with multiple wings (such as biplanes, canard wings, etc.), planes with multiple tails and or fuselages, planes with additional sections (such as pods, booms, adaptive and shape-shifting elements and others), wing-shaped airships, vertical take-off and landing (VTOL) aircraft, parasailing aircraft, wing-body aircraft (without a fuselage), tailless aircraft, aircraft with different propulsion systems (single-engine, multi-engine, propeller-based, turbo-based, jets, etc.), and so on.

In accordance with embodiments of the present invention, the aircraft 2500 may be equipped with a flight control system 2550, airflow sensors 2560 and 2561, flight control surfaces 2570, 2571 and 2572, and electrical wiring between these elements (e.g., 2580 and 2581). The flight control system 2550 may be fully autonomous, as for example on board of a UAV. On a manned aircraft, the flight control system 2550 may be manual, semi-autonomous, or fully autonomous. Typically, a manned aircraft has at least some autonomous flight control functionality, i.e., auto-pilot capabilities. The flight control system 2550 may monitor flight data provided by the sensors 2560 and 2561, analyze them, and provide necessary control inputs to the flight control surfaces 2570, 2571 and 2572 (or other flight control elements on the aircraft) and propulsion system 2540 in order to change any of the flight parameters, including airspeed, roll, yaw and pitch angles, acceleration, rate of descent/ascent, turning rate, etc.

Figure 26:
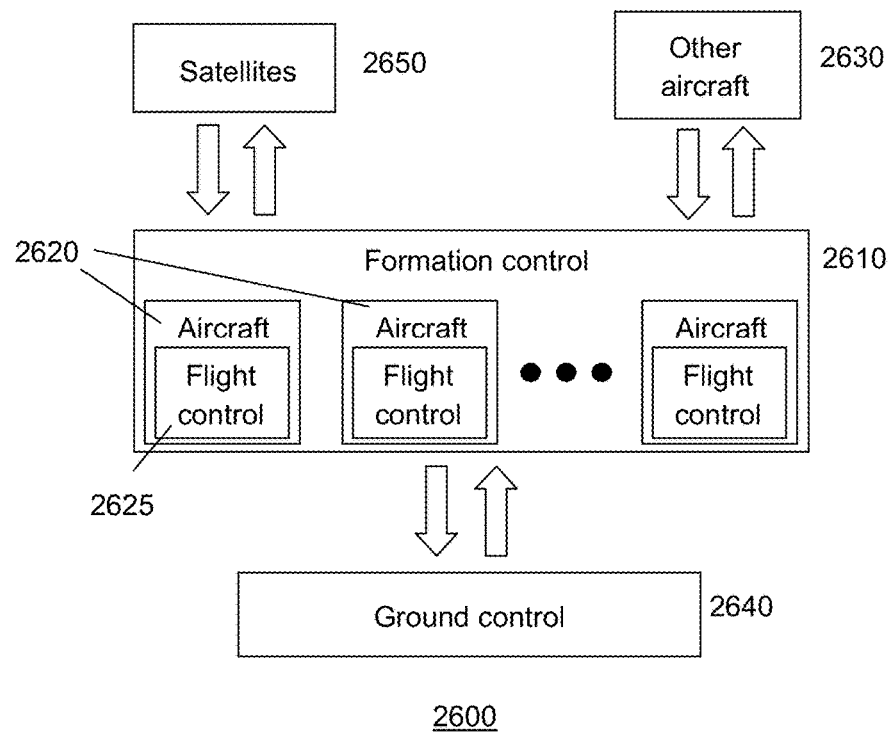
FIG. 26 shows the flight control architecture for a group of aircraft in a close formation fleet in accordance with at least some embodiments of the present invention.

In accordance with embodiments of the present invention, FIG. 26 shows the flight control architecture 2600 for a group of aircraft 2620 in close formation fleet 2610. Flight control systems 2625 on each aircraft 2620 in cooperation with each other establish the overall control of the formation fleet 2610. This cooperation may be enabled in part by the vortex sensing capabilities and in part by the communication and networking capabilities on at least some aircraft within the formation 2610. In addition, individual flight control systems 2625 on each aircraft 2620 may have dedicated software and hardware modules, which are tasked exclusively with functions of maintaining and controlling a close formation flight. The aircraft 2620 may be identical to each other or different. The flight control capabilities of the formation as a whole may be enhanced by other communications, including communications with other aircraft 2630 outside of the formation 2610, ground flight control stations 2640, and satellites 2650. These communications may help to establish, maintain and modify the formation 2610. Other aircraft 2630 may include for example aircraft that aims to join the formation 2610 or that have left the formation 2610. Ground flight control station 2640 may provide navigation services, flight plans, and other general flight commands to the formation 2610 via direct communication links. Satellites 2650 may provide similar services as well as indirect communication links with the ground flight control stations when direct communication links are not available.

Flight control tasks may be shared in the formation 2610 by individual flight controllers (i.e., flight control system 2625). These tasks may be performed by the respective onboard flight controllers or alternatively processors dedicated to flight formation tasks primarily, including data analysis, follower aircraft guidance, networking and communications inside the formation. A peer-to-peer network may be formed by the flight control systems 2625 to share flight control tasks equally. Alternatively, some flight control tasks may be delegated to the flight control systems on specific aircraft. For example, there may be at least one aircraft in a formation that is assigned the leader role. Such an aircraft (or several of them) may perform the navigational tasks for the whole fleet, including negotiating, setting, modifying and adjusting flight plans and waypoints. Flight control systems on other aircraft in this case may serve the functions of maintaining close formation exclusively.

Some formation flight tasks may be distributed across all or several aircraft. For example, evaluation of the combined flight formation metric may be shared so that each aircraft contributes its share in its calculation. Also, a formation flight health status may be evaluation in the same way by all formation aircraft, which may including flight statuses from all aircraft. In cases when one or more aircraft status reaches alarm level (e.g. relatively high battery depletion or higher fuel consumption with respect to other aircraft), this condition may trigger a change in the formation flight configuration, where one or more aircraft may move into a more favorable position (e.g., a leader may move into a follower position). A predetermined critical level of an individual aircraft flight status may be set for example at 5-10% higher battery depletion state relative to other aircraft. Alternatively, aircraft may be rotated on a periodic basis to ensure even battery depletion across the formation fleet.

Figure 27:
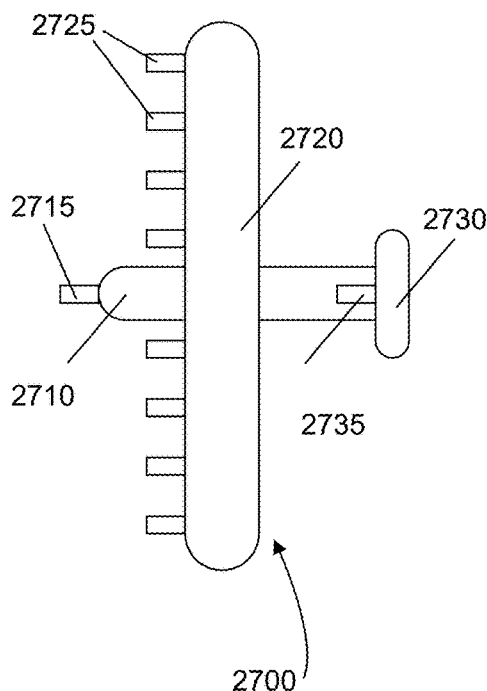
FIG. 27 shows an aircraft equipped with a series of airflow sensors mounted on various components of the aircraft in accordance with at least some embodiments of the present invention.

To enable effective close formation flight control, several vortex sensing approaches may be implemented. In accordance with embodiments of the present invention, FIG. 27 shows an aircraft 2700 equipped with a series of airflow sensors: sensors 2715 mounted on a fuselage 2710, sensors 2725 mounted on a wing 2720 and sensors 2735 mounted on a tail 2730. The function of these sensors is provide the flight controller with data characterizing the three-dimensional airflow around the aircraft (i.e., airflow along the three X, Y, and Z directions/axes). This data may then serve as the basis to extract sufficient information about the vortices near the aircraft 2700. The airflow sensors may be positioned on the body of the aircraft so that the air flow is not perturbed by the aircraft at the point of sensing, for example using stand-off booms, beams, long rods, bars, etc. In addition, other data may be used in combination with the airflow sensor data to facilitate the airflow analysis, including GPS positioning data (spatial position, orientation and acceleration), inertial navigation system data, telemetry data, data from other aircraft, data from ground control systems, data from weather control stations, data from air traffic control and so on.

Figure 28:
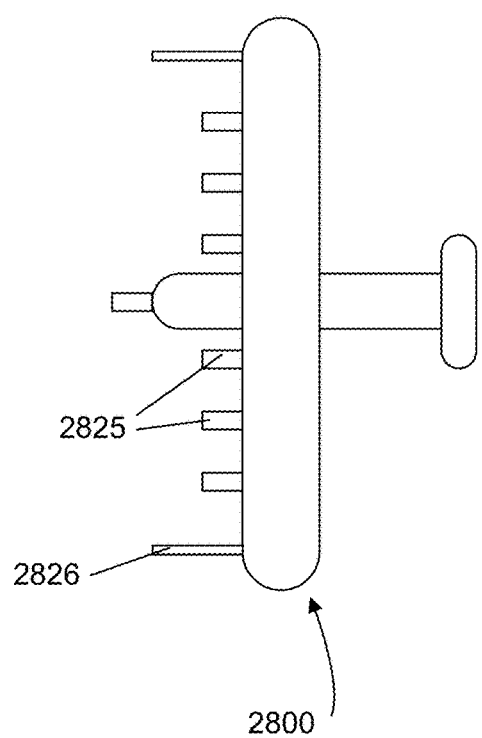
FIG. 28 shows an aircraft that may be equipped with at least two types of airflow sensors which may be positioned on different parts or locations of the airframe in accordance with at least some embodiments of the present invention.

Furthermore, FIG. 28 shows an aircraft 2800 that may be equipped with at least two types of airflow sensors: sensors 2825 and 2826. Different sensors may perform different types of sensing, e.g., measurements of airflow speed, airflow direction, air pressure, air temperature, angle of attack, and so on. Also, they may be positioned differently, i.e., on different parts or different location of the airframe as shown in FIG. 28. The methods for close formation flight outlined above and particularly the method of vortex sensing may use airflow sensors shown in FIGS. 27 and 28 to collect data for constructing the computer vortex model. Aircraft 2700 and 2800 both use arrayed sensors or sensor arrays, as represented by the sensors 2715, 2725, 2735, 2825 and 2826, respectively, to characterize the airflow around each aircraft, provide relevant measurements and deliver data to a flight control system for analysis, creation and update of a vortex model.

Figure 29:
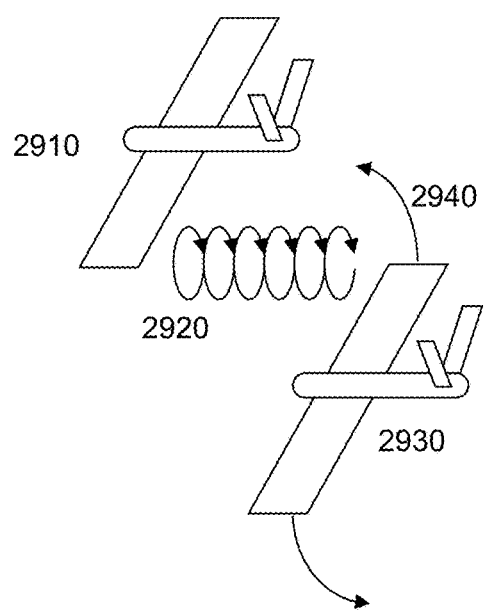
FIG. 29 shows a dual close formation consisting of two aircraft in accordance with at least some embodiments of the present invention.

In addition, the aircraft as a whole may be used as an airflow sensor. For example, an upwash created by a vortex may induce a rolling moment in an aircraft. This situation is illustrated in FIG. 29, where a dual close formation 2900 is shown consisting of two aircraft: a leader aircraft 2910 and a follower aircraft 2930. The leader aircraft 2910 produces a wingtip vortex 2920 on its left-hand side, which in turn produces excess lift on the right half of the wing of the follower aircraft 2930, while the lift of the left half of the wing remains nearly the same as that outside the formation. As a result, the follower aircraft 2930 is subjected to a counter-clockwise rolling moment 2940. In order to compensate for this moment and remain level, a flight control system may use flight control surfaces (such as ailerons) to introduce a counter-rolling moment in the opposite direction. The flight control signal required to maintain the follower aircraft in the level position (e.g., the magnitude of aileron's deflection) may serve as a measure of the vortex 2920 relative position with respect to the follower aircraft 2930. The optimum vortex position may be near the position at which this moment is maximized. Therefore, various peak searching algorithms may be implemented to maximize the rolling moment and as a result bring the relative positions between the two aircraft close to the optimum position. This method may be used for vortex searching, vortex sensing, vortex tracking, coarse alignment and fine alignment described above.

Figure 30:
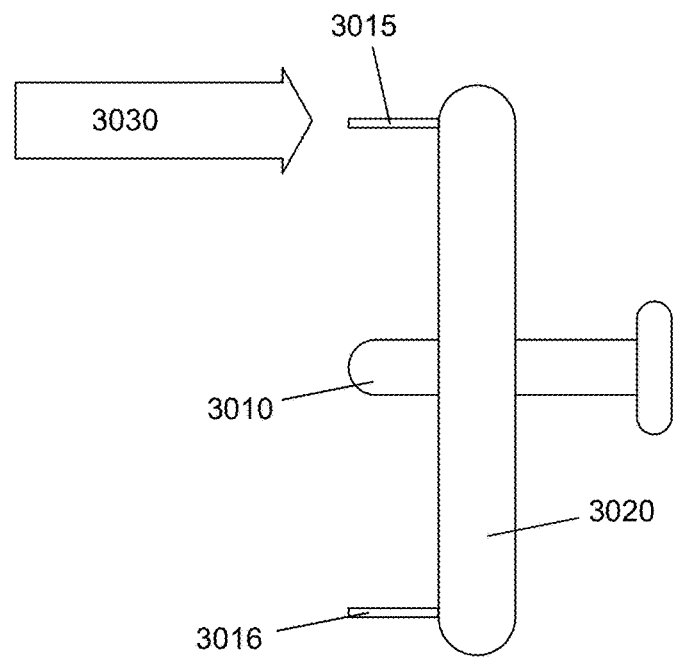
FIG. 30 shows an airflow sensing system, in which an aircraft has airflow sensors mounted at two special locations of the wing in accordance with at least some embodiments of the present invention.

In accordance with embodiments of the present invention, airflow sensors and probes for characterization of air flow around an aircraft may be positioned in special key locations on the aircraft that can simplify, accelerate or otherwise enhance the process of vortex searching, sensing and tracking. FIG. 30 shows an airflow sensing system 3000, in which an aircraft 3010 has airflow sensors 3015 and 3016 mounted at two special locations of the wing 3020. These locations correspond to the optimum positions of a vortex center (or the center of a vortex core) 3030 on both sides of the wing. The optimum vortex position is defined as the position at which there is a maximum formation benefit to the follower aircraft, e.g., maximum drag reduction. These positions can be calculated and sensors can be designed and mounted in these positions for a given vortex distribution before the formation flight. In general, the optimum vortex position depends weakly on the vortex characteristics, e.g., its size, core radius, etc. Therefore, these sensor positions can be located with high accuracy at the design and production phases in aircraft manufacturing.

Figure 31:
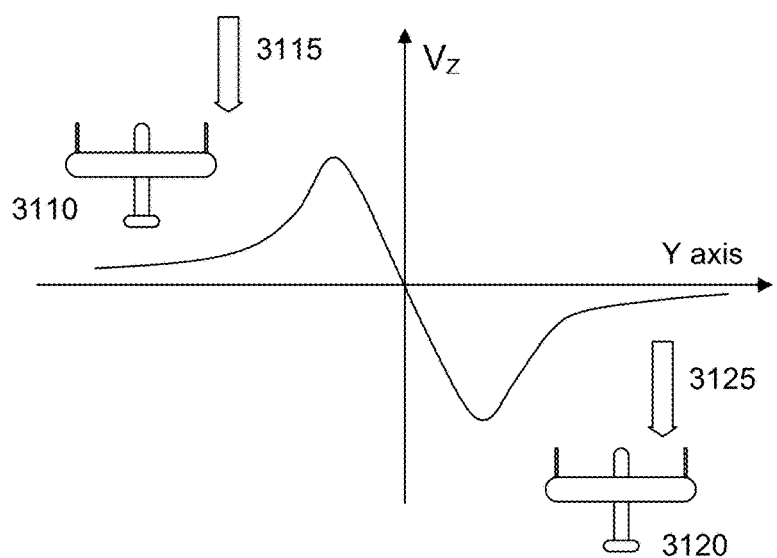
FIG. 31 shows a graph of the vertical air velocity $V_Z$ produced by an eye sensor versus the lateral (spanwise) displacement of the vortex Y with respect to the eye sensor.

Airflow sensors 3015 and 3016 may provide airflow data, such instantaneous air velocities and their vectors at their locations, including their projections on coordinate axes: $V_X$, $V_Y$, and $V_Z$. When the vortex 3030 is centered on the sensor 3015 (or alternatively 3016), $V_Y$ and $V_Z$ magnitudes should be close to zero. Accordingly, since sensors 3015 and 3016 determine to the location of the vortex "eye" (i.e., its core), they may be termed as vortex eye sensors or eye sensors. When a vortex is displaced, $V_Y$ and $V_Z$ magnitudes provided by eye sensors become positive or negative depending on the direction of the displacement. This is illustrated in FIG. 31, which shows a graph 3100 of the vertical air velocity $V_Z$ produced by an eye sensor versus the lateral (spanwise) displacement of the vortex Y with respect to the eye sensor. For negative displacements in this case, where the aircraft 3110 shifts left with respect to the vortex 3115, $V_Z$ becomes positive. Conversely, for positive displacements in this case, where the aircraft 3120 shifts left with respect to the vortex 3125, $V_Z$ becomes negative. Therefore, the sign and the magnitude of the $V_Z$ measurements provided by the eye sensor may be used directly by the flight control system for course correction and vortex tracking without complicated data analysis, which simplifies flight control and makes it much faster and responsive. Similar results may be achieved with $V_Y$ measurements provided by an eye sensor, which in turn may be used to control the Z position with respect to the vortex core.

In accordance with embodiments of the present invention, several specialized airflow sensors may be used for vortex sensing described above. They include airflow sensors and probes based on Pitot tubes, vanes, hot wires and others of different designs as described below.

Figure 32:
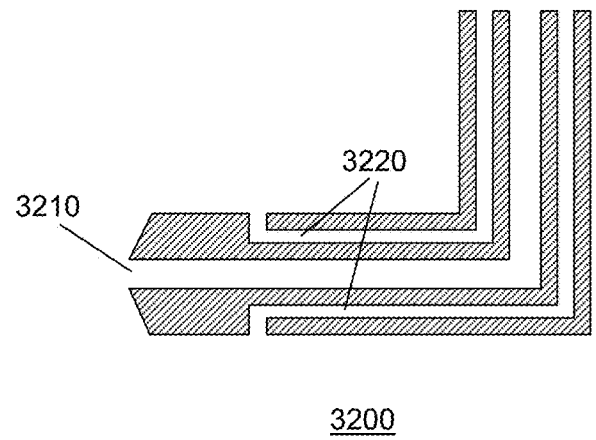
FIG. 32 shows a cross-section of a Pitot tube used for air speed measurements in accordance with at least some embodiments of the present invention, in which there are two air channels.

A cross-section of a Pitot tube 3200 used for air speed measurements is shown in FIG. 32, in which there are two air channels 3210 and 3220. The air channel 3210 may be used to measure the dynamic pressure, which is influenced by the air speed, while the air channel 3220 may be used to measure the static pressure, which is not influenced by the air speed. The difference between the dynamic and static pressures may then be used as a measure of the air speed. This device is not capable of measuring the complete air velocity vector, including $V_Y$ and $V_Z$ components.

Figure 33:
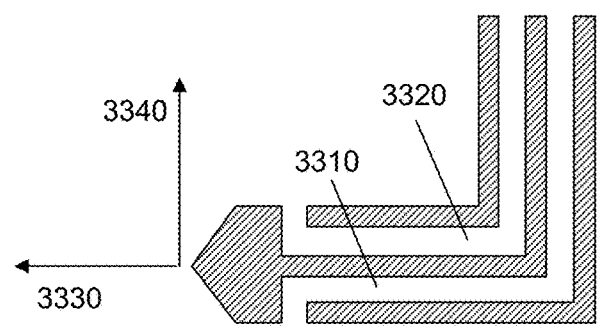
FIG. 33 shows a specialized airflow probe in accordance with at least some embodiments of the present invention which may be used to measure $V_Y$ and $V_Z$ components.

In accordance with embodiments of the present invention, a specialized airflow probe 3300 based on a Pitot tube approach as shown in FIG. 33 may be used to measure $V_Y$ and $V_Z$ components. The airflow probe 3300 includes two air channels 3310 and 3320 with input port facing in opposite directions from each other and perpendicular to the streamwise direction 3330. The input ports may be aligned either in the vertical direction (as shown in FIG. 33) or in the horizontal direction (or in any other plane if required), which is indicated as the probe measurement axis 3340. In the absence of the air flow in the direction of the probe's measurement axis 3340, the air pressure in the two channels 3310 and 3320 is the same and the difference between their air pressures is zero. In the presence of the air flow in the direction of the probe's measurement axis 3340 (e.g., non-zero $V_Z$ when the measurement axis is the Z-axis), the difference between the air pressures in the two channels 3310 and 3320 is proportional to the square of the air velocity in this direction (e.g., $V_Z$).

Figure 34:
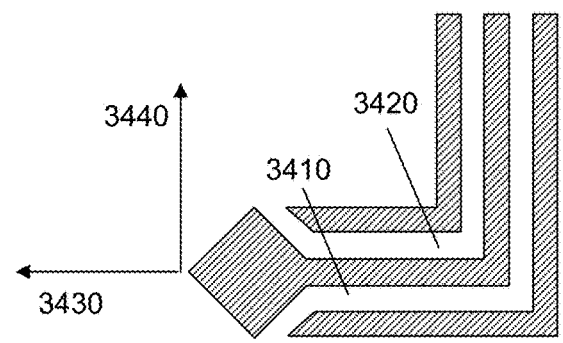
FIG. 34 shows input ports of a specialized airflow probe aligned either in the vertical direction or in the horizontal direction (or in any other plane if required) in accordance with at least some embodiments of the present invention.

In accordance with embodiments of the present invention, a specialized airflow probe 3400 based on a Pitot tube approach as shown in FIG. 34 may be used to measure $V_Y$ and $V_Z$ components. The airflow probe 3400 includes two air channels 3410 and 3420 with input port facing in directions at the right angle from each other (or other angle greater than 0 and less than 180 degrees). The input port of channels 3410 and 3420 may also be positioned symmetrically with respect to the streamwise direction of the probe 3430. The input ports may be aligned either in the vertical direction (as shown in FIG. 34) or in the horizontal direction (or in any other plane if required), which is indicated as the probe measurement axis 3440. In the absence of the air flow in the direction of the probe's measurement axis 3440, the air pressure in the two channels 3410 and 3420 is the same and the difference between their air pressures is zero. In the presence of the air flow in the direction of the probe's measurement axis 3440 (e.g., non-zero $V_Z$ when the measurement axis is the Z-axis), the difference between the air pressures in the two channels 3410 and 3420 is proportional to the air velocity in this direction (e.g., $V_Z$).

Figure 35:
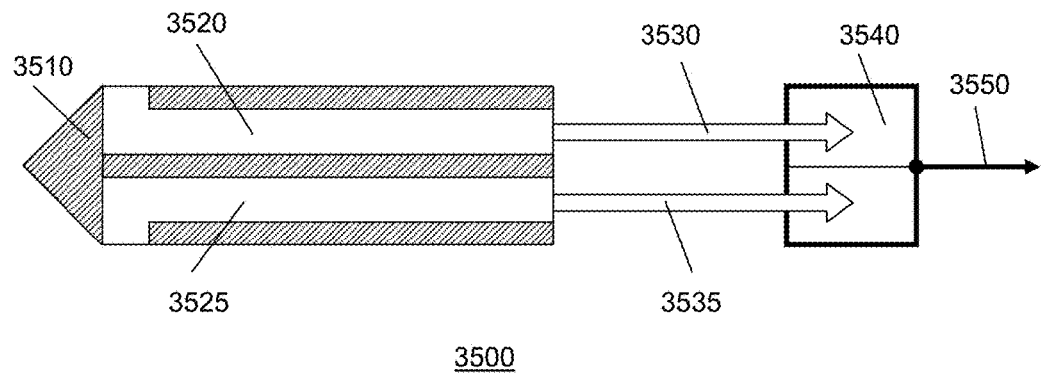
FIG. 35 shows a specialized airflow sensor in accordance with at least some embodiments of the present invention which may be used to measure air flow speed and direction.

In the description below probes of the type shown in FIGS. 33 and 34 are defined as differential airflow probes. In accordance with embodiments of the present invention, a specialized airflow sensor 3500 based on the differential airflow tube design may be used to measure air flow speed and direction as shown in FIG. 35. The airflow sensor 3500 includes an airflow probe 3510, comprising at least two air channels 3520 and 3525, air connectors 3530 and 3535, and a transducer 3540. The airflow probe 3510 may be one of the probes 3300 and 3400, or similar. In general, the airflow probes may have different forms and shapes and be characterized by the same basic designs shown in FIGS. 33 and 34. The air connectors 3530 and 3535 (e.g., air pressure tubes) may be used to provide air pressure inputs for the transducer 3540, which provides and electrical output signal 3550 proportional to the difference between the air pressures in the channels 3520 and 3525.

The airflow sensor 3500 may also comprise additional airflow probes and transducers connected to these probes. The airflow probes may be integrated into one or more units. Similarly the transducers may be integrated into one or more units. The transducers may also be integrated in one unit with the probes to minimize air pressure distortions from the connectors. Different airflow probes may have different measurement axes, so that air flow velocity vectors may be measured in all directions and full characterization of air flow may be provided as a result.

Figure 36:
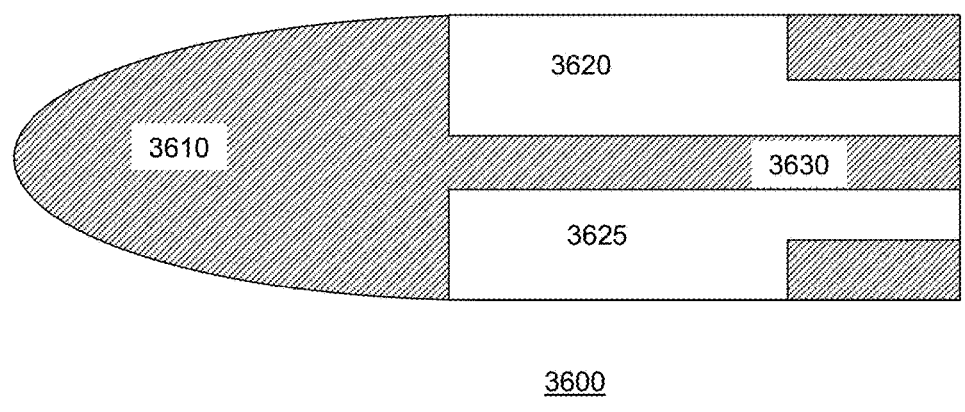
FIG. 36 shows a specialized airflow probe head in accordance with at least some embodiments of the present invention which may be used for air flow measurements.

In accordance with embodiments of the present invention, a specialized airflow probe head 3600 may be used for air flow measurements as shown in FIG. 36. The probe head 3600 may include a cone-shaped top 3610 and air channels 3620 and 3625 separated by a wall 3630. A cone-shaped top may be used to minimize air resistance and disturbance in the air flow by the probe itself. Large openings for air channels 3620 and 3625 improve probe sensitivity to small air flows (low air speeds) in the measurement axis direction. The probe measurement axis may be perpendicular to the streamwise direction of the probe (e.g., vertical in FIG. 36).

Figure 37:
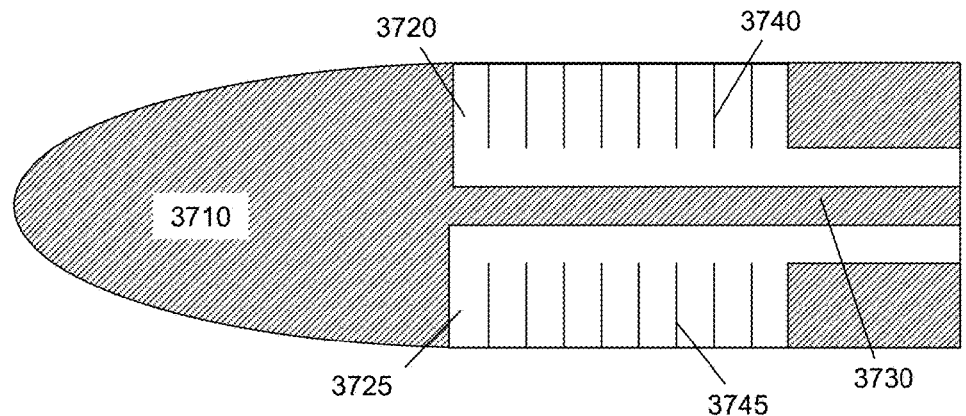
FIG. 37 shows another specialized airflow probe head in accordance with at least some embodiments of the present invention which may be used for air flow measurements

Another specialized airflow probe head 3700 may be used for air flow measurements as shown in FIG. 37. The probe head 3700 may also include a cone-shaped top 3710 and air channels 3720 and 3725 separated by a wall 3730. In addition, the probe head 3700 may include fins 3740 and 3745 for streamlining air flow through the air channels 3720 and 3725. The fins may be aligned parallel to the probe measurement axis or side wall of the air channels. Both probe head designs and other similar probe head designs may be implemented in the airflow probes and sensors described above (e.g., 3300, 3400, and 3500).

Figure 38:
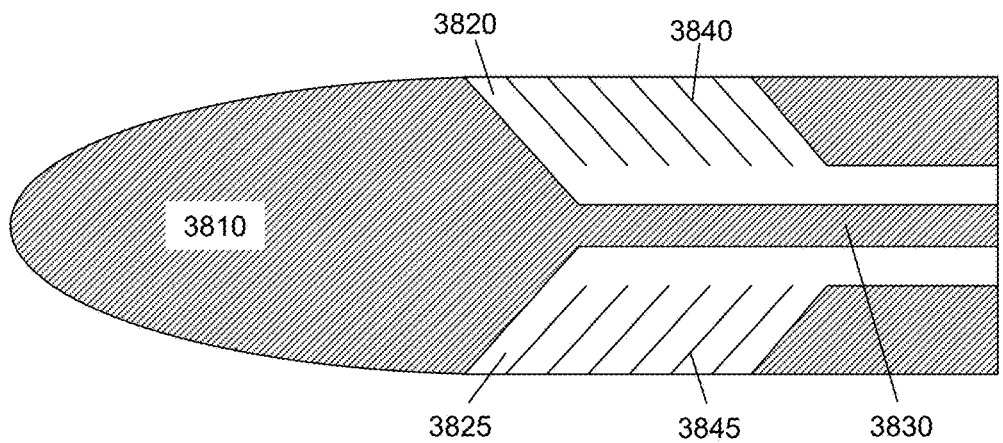
FIG. 38 shows a specialized airflow probe head in accordance with at least some embodiments of the present invention which may be used for air flow measurements

In accordance with embodiments of the present invention, a specialized airflow probe head 3800 may be used for air flow measurements as shown in FIG. 38. The probe head 3800 may include an oblong top 3810 and air channels 3820 and 3825 separated by a wall 3830. The air channels may be angled with respect to the measurement axis and the streamwise direction (e.g., they may form 45 degree angle with the vertical measurement axis and the streamwise direction in FIG. 38). Although a 45 degree angle is shown in FIG. 38, other angles may also be used as described above with respect to FIG. 34. In addition, the probe head 3800 may include fins 3840 and 3845 for streamlining air flow through the air channels 3820 and 3825, respectively. The fins may be aligned parallel to the side wall of the air channels and form the same angles with respect to the measurement axis and the streamwise direction as the channels as a whole.

Figure 39:
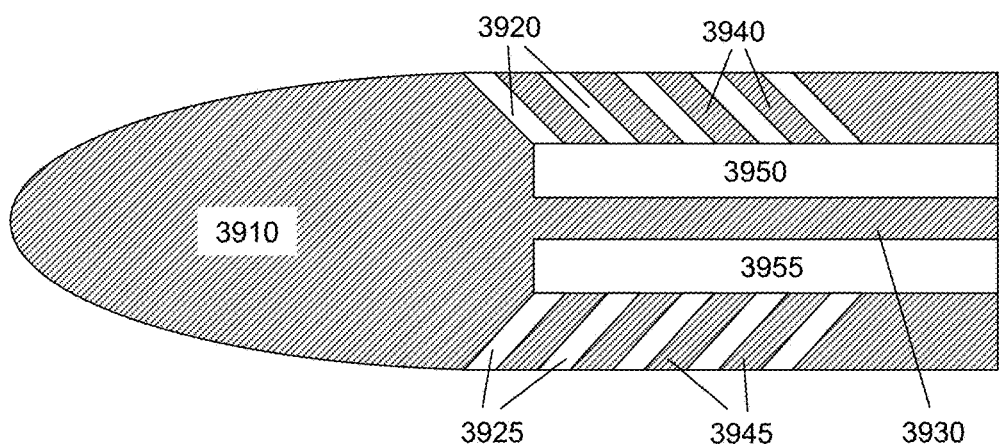
FIG. 39 shows another specialized airflow probe head in accordance with at least some embodiments of the present invention which may be used for air flow measurements

Another specialized airflow probe head 3900 may be used for air flow measurements as shown in FIG. 39. The probe head 3900 may also include an oblong top 3910 and pluralities of air channels 3920 and 3925 separated by a walls 3930, 3940 and 3945. The group of air channels 3920 is connected to the common channel 3950, and the group of air channels 3925 is connected to the common channel 3955. Both probe head designs 3800 and 3900 and other similar probe head designs may be implemented in the airflow probes and sensors described above (e.g., 3300, 3400, and 3500).

Figure 40:
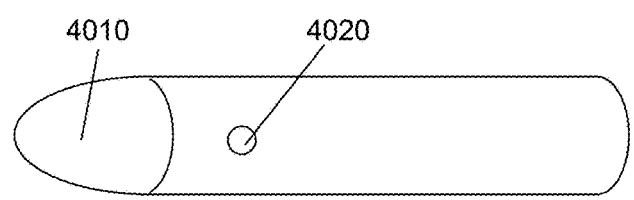
FIG. 40 shows a three-dimensional view of a specialized airflow probe head in accordance with at least some embodiments of the present invention.
Figure 41:
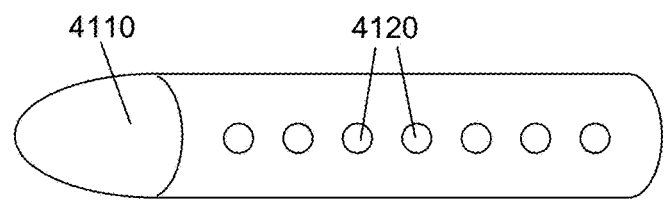
FIG. 41 shows a three-dimensional view of another specialized airflow probe head in accordance with at least some embodiments of the present invention.

In accordance with embodiments of the present invention, FIG. 40 shows a three-dimensional view of a specialized airflow probe head 4000, comprising an aerodynamically efficient oblong body 4010 and at least one pair of air channels 4020 (the opposite side air channel opening is not visible in FIG. 40). Similarly, FIG. 41 shows a three-dimensional view of a specialized airflow probe head 4100, comprising an aerodynamically efficient oblong body 4110 and plurality of parallel air channels 4120 (the opposite side air channel openings are not visible in FIG. 41). A larger number of parallel air channels may lead to an increased sensitivity to small airflows and small variations in the airflow in the direction of the measurement axis.

Figure 42:
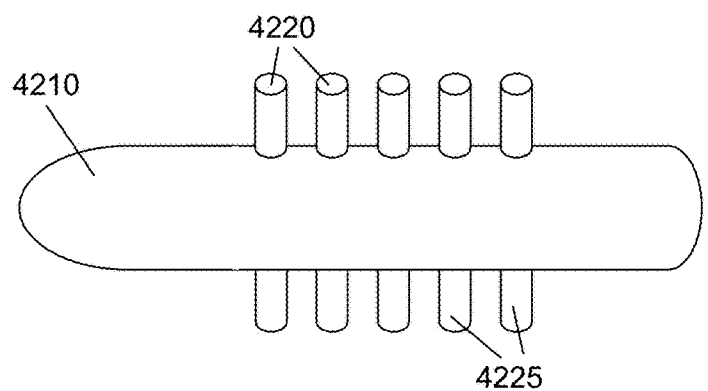
FIG. 42 shows a three-dimensional view of another specialized airflow probe head in accordance with at least some embodiments of the present invention

FIG. 42 shows a three-dimensional view of a specialized airflow probe head 4200, comprising an aerodynamically efficient oblong body 4210 and plurality of parallel air tubes 4220 and 4225. The air tubes 4220 and 4225 may be used as extended openings for inner air channels (e.g., air channels 4120 in FIG. 41). The channel extension may allow more accurate measurement of air flow velocity vectors and their variations by moving the channel openings away from the probe body 4210.

Figure 43:
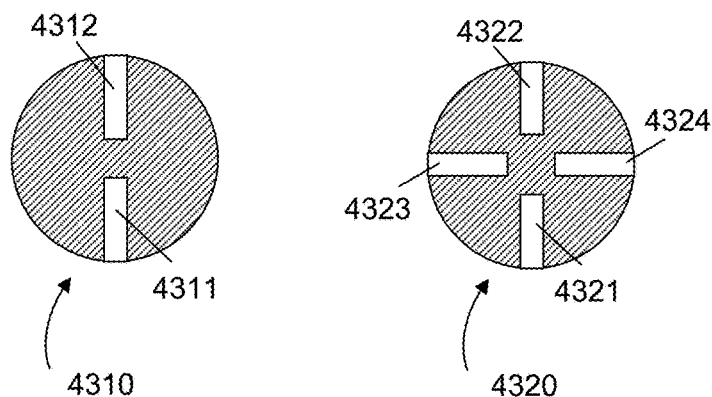
FIG. 43 shows cross-sections of airflow probe heads in the plane perpendicular to the probe streamwise direction (e.g., X axis) in accordance with at least some embodiments of the present invention.

In accordance with embodiments of the present invention, FIG. 43 shows cross-sections of airflow probe heads 4310 and 4320 in the plane perpendicular to the probe streamwise direction (e.g., X axis). The probe head 4310 may have at least one pair of measurement air channels 4311 and 4312, which in this case may provide measurements of air velocity in the vertical direction (i.e., $V_Z$). When rotated, the same probe head 4310 may provide measurements of air velocity in the horizontal direction (i.e., $V_Y$). The probe head 4320 may have at least two pairs of measurement air channels: 4321 and 4322, and 4323 and 4324, which may provide simultaneous measurements of air velocity in both vertical and horizontal directions (i.e., $V_Y$ and $V_Z$). Additional air channels may also be provided: for example, a standard Pitot channel may be provided for the measurements of a streamwise air speed component (i.e., $V_X$), so that a complete air velocity vector may be obtained.

Figure 44:
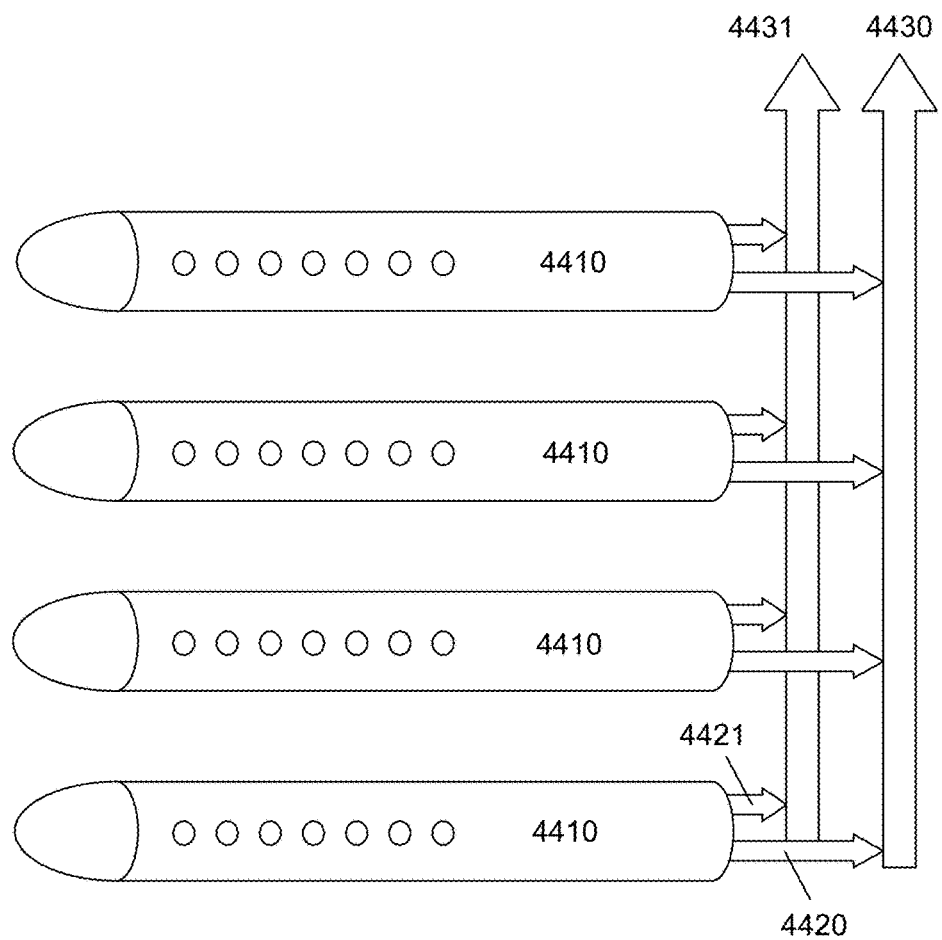
FIG. 44 shows an airflow probe comprising an array of airflow probe heads in accordance with at least some embodiments of the present invention.

In accordance with embodiments of the present invention, FIG. 44 shows an airflow probe 4400 comprising an array of airflow probe heads 4410, similar to the airflow probe head 4100. Each airflow probe head 4410 may have output ports 4420 and 4421, which in turn may be connected to the common ports 4430 and 4431. The common ports may then be connected to a common air pressure transducer for differential pressure measurements. This approach allows one to collect and average several probe air pressure measurements, thus improving signal resolution and measurement sensitivity.

Figure 45:
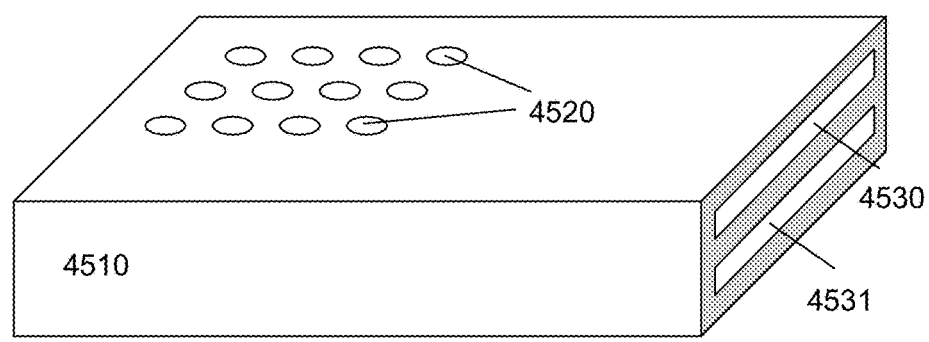
FIG. 45 shows a three-dimensional view of an airflow probe in accordance with at least some embodiments of the present invention.

In accordance with embodiments of the present invention, FIG. 45 shows a three-dimensional view of an airflow probe 4500, the body 4510 of which is a thin plate. The airflow probe 4500 has two pairs of air channels with multiple openings on wider sides of the body; the top openings 4520 are visible in FIG. 45. The air channels have output ports 4530 and 4531, which may be used for connection to the air pressure transducer. The probe measurement axis may be perpendicular to the wider side of the probe body 4510 (i.e., vertical in FIG. 45). The shape of the body 4510 may be rounded to decrease aerodynamic resistance.

Figure 46:
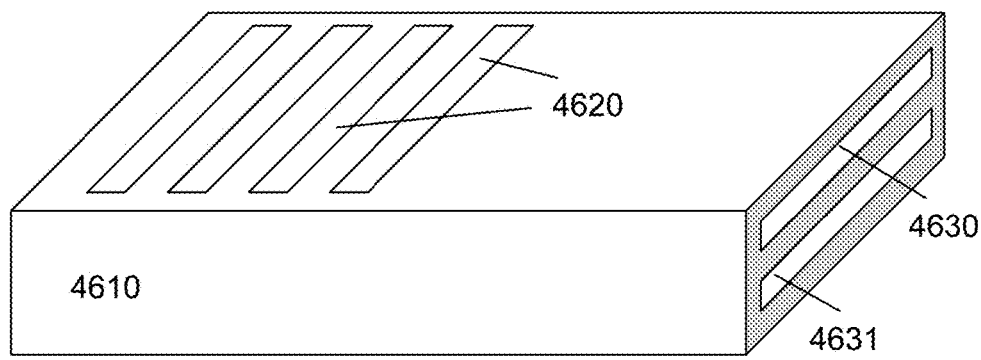
FIG. 46 shows a three-dimensional view of another airflow probe in accordance with at least some embodiments of the present invention.

In accordance with embodiments of the present invention, FIG. 46 shows a three-dimensional view of an airflow probe 4600, the body 4610 of which is a thin plate. The airflow probe 4600 has two pairs of air channels with multiple openings on wider sides of the body; the top openings 4620 are visible in FIG. 46. The air channels have output ports 4630 and 4631, which may be used for connection to an air pressure transducer. The probe measurement axis may be perpendicular to the wider side of the probe body 4610 (i.e., vertical in FIG. 46). The shape of the body 4610 may be rounded to decrease aerodynamic resistance.

Figure 47:
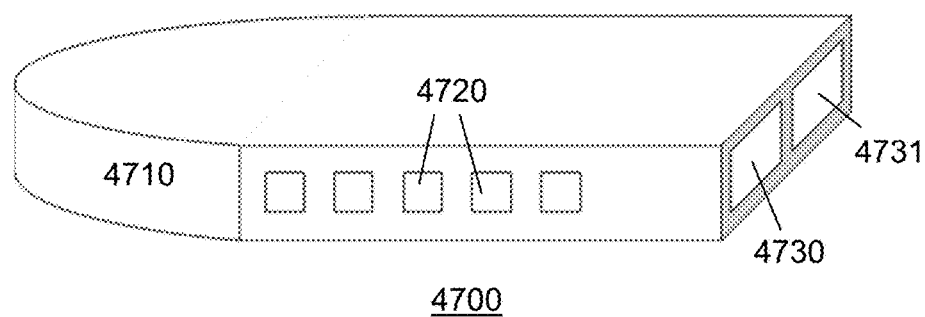
FIG. 47 shows a three-dimensional view of another airflow probe in accordance with at least some embodiments of the present invention.

In accordance with embodiments of the present invention, FIG. 47 shows a three-dimensional view of an airflow probe 4700, the body 4710 of which is a thin plate. The airflow probe 4700 has two pairs of air channels with multiple openings on narrower sides of the body; the side openings 4720 are visible in FIG. 47. The air channels have output ports 4730 and 4731, which may be used for connection to an air pressure transducer. The probe measurement axis may be perpendicular to the narrower side of the probe body 4710 (i.e., horizontal in FIG. 47). Measurements in this direction may be less affected by the shape of the body than in the orthogonal direction. The shape of the body 4710 may be rounded to decrease aerodynamic resistance.

Figure 48:
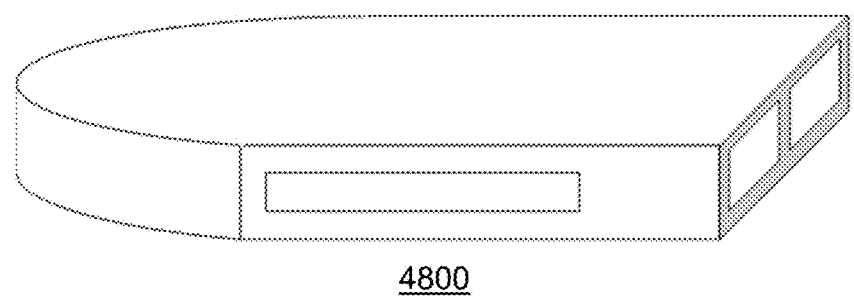
FIG. 48 shows a three-dimensional view of another airflow probe in accordance with at least some embodiments of the present invention.

In accordance with embodiments of the present invention, FIG. 48 shows a three-dimensional view of an airflow probe 4800, the body of which is a thin plate. The airflow probe 4800 has a pair of air channels with single openings on narrower sides of the body. The air channels have two output ports, which may be used for connection to an air pressure transducer. The probe measurement axis may be perpendicular to the narrower side of the probe body (i.e., horizontal in FIG. 48). Measurements in this direction may be less affected by the shape of the body than in the orthogonal direction. The shape of the body may be rounded to decrease aerodynamic resistance.

Figure 49:
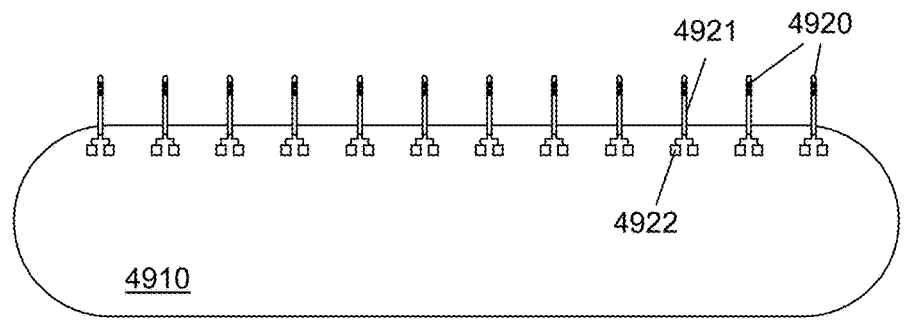
FIG. 49 shows airflow sensor array system in accordance with at least some embodiments of the present invention in which a plurality of airflow sensors are mounted on a wing.

In accordance with embodiments of the present invention, FIG. 49 shows airflow sensor array system 4900, in which a plurality of airflow sensors 4920 are mounted on a wing 4910. Each sensor comprises an airflow probe 4921 and at least one air pressure transducer 4922. Various numbers of airflow sensors may be used in the system 4900, the greater number of sensors results in a finer (better) spatial resolution in the airflow measurements and subsequent mapping of a vortex field.

Figure 50:
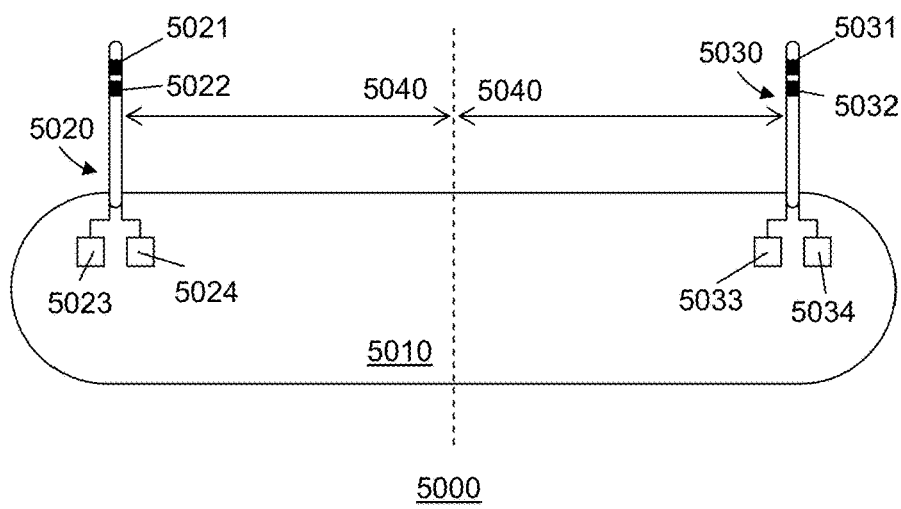
FIG. 50 shows an airflow sensor system in accordance with at least some embodiments of the present invention, which may be used for airflow characterization and vortex sensing.

Alternatively, an airflow sensor system 5000 shown in FIG. 50 may be used for airflow characterization and vortex sensing, which comprises a pair of airflow sensors 5020 and 5030 mounted in specific locations at distances 5040 from the center line of the wing 5010. The specific locations correspond to the optimum positions of vortex centers with respect to the wing 5010. Furthermore, the left-hand side airflow sensor 5020 may comprise air pressure probes 5021 and 5022, which may have orthogonal to each other measurement axes (e.g., Y and Z axis) and connected to the air pressure transducers 5023 and 5024, respectively. The right-hand side airflow sensor 5030 may comprise air pressure probes 5031 and 5032, which may have orthogonal to each other measurement axes (e.g., Y and Z axis) and connected to the air pressure transducers 5033 and 5034, respectively. The airflow sensor system 5000 is an eye sensor, which enables a flight control system to effectively and quickly track vortices on both sides of the aircraft. The sensors 5020 and 5030 may be used together or separately. For example, while one sensor (e.g., sensor 5020) is used to track a vortex, the other sensor (5030) may be used as a reference to subtract any airflows caused by the aircraft motion. Alternatively, additional reference sensors may be mounted on a wing or other parts of the aircraft.

Figure 51:
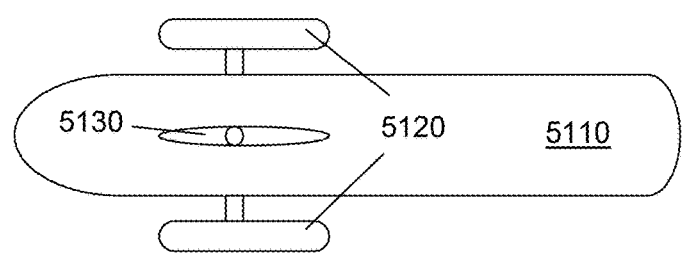
FIG. 51 shows an alternative airflow probe in accordance with at least some embodiments of the present invention.

In accordance with embodiments of the present invention, FIG. 51 shows an alternative airflow probe 5100. The airflow probe 5100 may include an oblong body 5110, at least one vane 5120 and at least one vane 5130 in orthogonal direction. During the airflow measurements, the vanes may align themselves along the direction of the airflow. The deflection angle for each vane may be measured to represent the air velocity angle with respect to a particular axis or direction, primarily the streamwise direction (e.g., the X axis). These measurements of the air velocity vector angles with respect to the streamwise direction of the probe 5100 can be combined with the air speed measurements from a standard Pitot tube sensor to obtain a complete air velocity vector. For example, the vane 5120 may provide measurements of the spanwise component of air velocity $V_Y$, the vane 5130 may provide measurements of the vertical component of air velocity $V_Z$.

Figure 52:
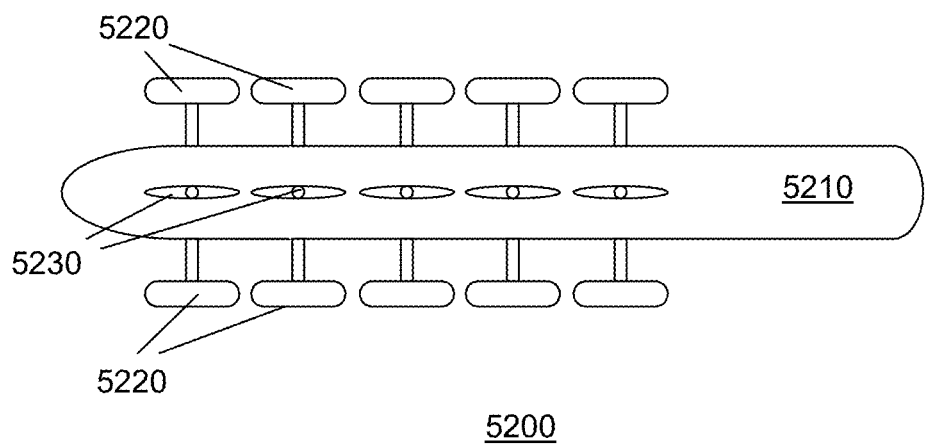
FIG. 52 shows another vane-based airflow probe in accordance with at least some embodiments of the present invention.

In accordance with embodiments of the present invention, FIG. 52 shows another vane-based airflow probe 5200. The airflow probe 5200 may include an oblong body 5210, a first array of vanes 5220 and a second array of vanes 5230 in the orthogonal direction. During the airflow measurements, the vanes may align themselves along the direction of the airflow. The deflection angle for each vane may be measured to represent the air velocity angle with respect to a particular axis or direction, primarily the streamwise direction (e.g., the X axis). Similar to the probe 5100, the vane array 5220 may provide measurements of the spanwise component of air velocity $V_Y$, the vane array 5230 may provide measurements of the vertical component of air velocity $V_Z$. The vane array may improve the accuracy of measurements in comparison to that of a single vane.

Figure 53:
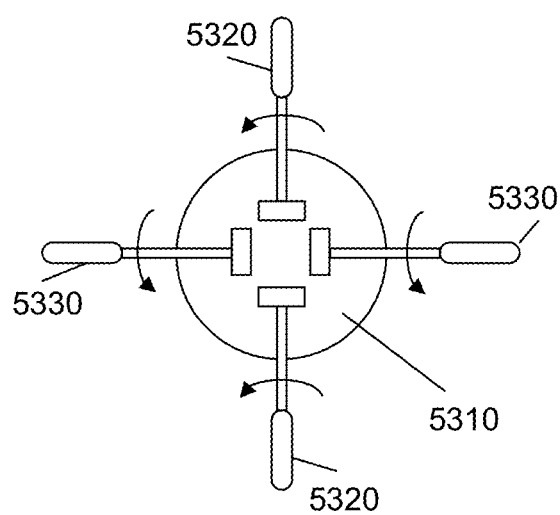
FIG. 53 further illustrates the working principle of the vane-based airflow probe by showing a cross-section of a vane airflow probe in accordance with at least some embodiments of the present invention.

FIG. 53 further illustrates the working principle of the vane airflow probe by showing a cross-section of a vane airflow probe 5300, which comprises a body 5310, a first set of vanes 5320 and a second set of vanes 5330. The vanes may rotate under the influence of the airflow around the body 5310 as shown in FIG. 53. The rotation angle may registered and measured by a transducer attached to each vane. The vanes and vane arrays may be also mounted on stand-off mounts to eliminate potential interference with the probe body.

Figure 54:
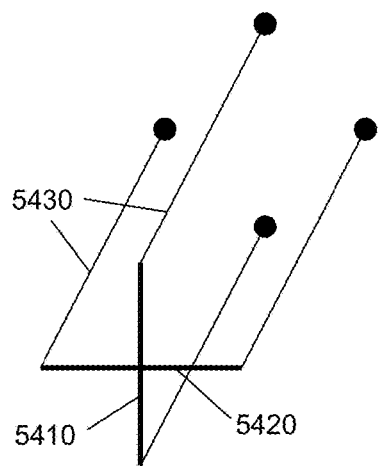
FIG. 54 shows alternative airflow probe based on a hot wire principle, in accordance with at least some embodiments of the present invention.

In accordance with embodiments of the present invention, FIG. 54 shows alternative airflow probe 5400 based on a hot wire principle. The probe 5400 includes at least one hot wire 5410 and an optional second hot wire 5420 connected to electrical prongs 5430. Electrical current may be used to heat the hot wires 5410 and 5420. Airflow perpendicular to a hot wire may cool the wire, changing its temperature. The temperature change then can be used as the measure of the air velocity normal to the wire. Alternatively, the hot wire current may be adjusted to keep the temperature constant, in which case the current change may serve as the measure of the air velocity.

Figure 55:
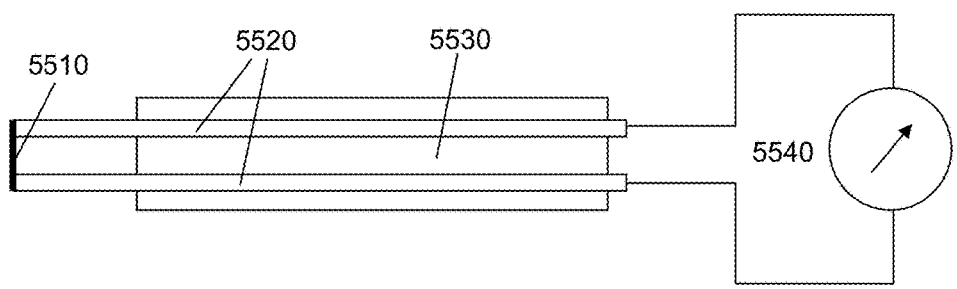
FIG. 55 shows an alternative airflow sensor based on a hot wire principle, in accordance with at least some embodiments of the present invention.

In accordance with embodiments of the present invention, FIG. 55 shows an alternative airflow sensor 5500 based on a hot wire principle. The hot wire sensor 5500 comprises a hot wire probe 5510, mounts 5520, a sensor holder 5530, and the electrical circuit 5540 used to monitor the resistance of the hot wire probe 5510. The hot wire may be made from tungsten or platinum, so that small changes in hot wire temperature may produce noticeable changes in its electrical resistance. As a result, air velocity may be directly measured by the electrical circuit 5540. Multiple hot wire probes may be combined to produce multiple measurements of air velocity in different directions and thus fully characterize the air velocity vector.

Figure 56:
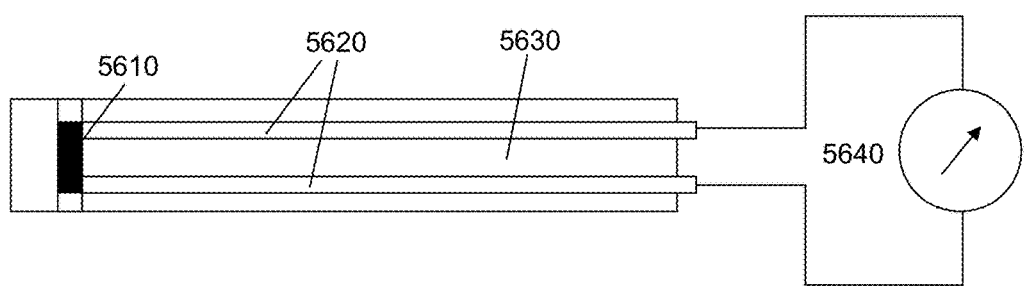
FIG. 56 shows another alternative airflow sensor based on a hot film principle, in accordance with at least some embodiments of the present invention.

In accordance with embodiments of the present invention, FIG. 56 shows another alternative airflow sensor 5600 based on a hot film principle. The hot film sensor 5600 comprises a hot film probe 5610, electrical contacts 5620, a sensor housing 5630, and the electrical circuit 5640 used to monitor the resistance of the hot film probe 5610. The hot film probe operates similarly to the hot wire sensor, i.e., it changes its temperature in response to the air flow across its surface. The temperature changes induce either changes in resistance or electrical current, which may be measured directly by the electrical circuit 5640.

Figure 57:
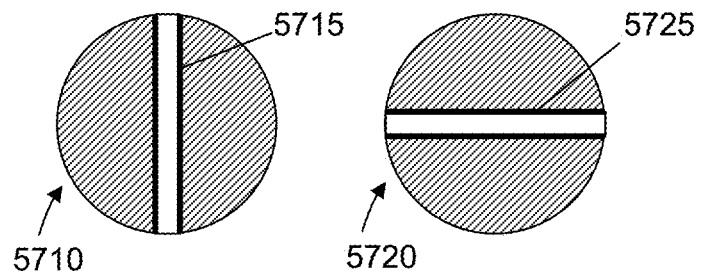
FIG. 57 shows cross-sections of two orthogonal hot film probes, in accordance with at least some embodiments of the present invention.

Multiple hot film probes may be combined to produce multiple measurements of air velocity in different directions and thus fully characterize the air velocity vector. FIG. 57 shows cross-sections of two orthogonal hot film probes 5710 and 5720, in which hot films 5715 and 5725 respectively may be deposited on the inside of round openings in the body or housing of the probe. As a result, air velocity components in orthogonal directions (e.g., $V_Y$ and $V_Z$) may be effectively measured and used in characterization of a wingtip vortex.

Figure 58:
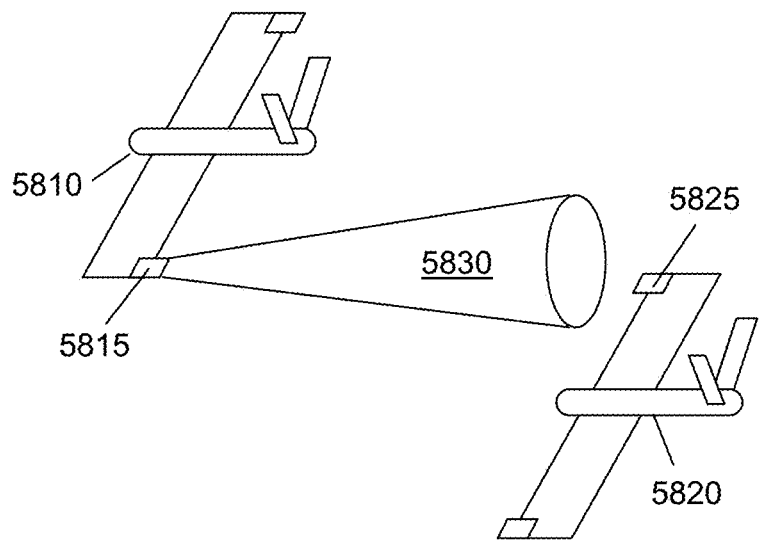
FIG. 58 shows a free-space optics approach, in accordance with at least some embodiments of the present invention, in which a leader aircraft is equipped with an optical source to produce a light beam at one of the wingtips along the streamwise direction towards a follower aircraft.

In accordance with embodiments of the present invention, different apparatus and methods may be used to assist the vortex searching and coarse aligning with a vortex in a close formation. Although described separately, the following apparatus and methods to assist the vortex searching and coarse aligning with a vortex may be used in any combination with each other. For example, FIG. 58 shows free-space optics system 5800, in which a leader aircraft 5810 is equipped with an optical source (e.g., a laser or a high power light emitting diode) to produce a light beam 5830 at one of the wingtips along the streamwise direction towards a follower aircraft 5820. The follower aircraft 5820 is equipped with a light detector 5825 (or light sensor array), which can be used to detect and monitor the light beam 5830. The light beam 5830 may approximately follow the path of a wingtip vortex and facilitate the vortex search.

Instead of the light detector 5825, the follower aircraft 5820 may be equipped with a video camera and a thermal imaging device. A video or imaging camera may provide imaging data that may be used for imaging analysis and achieve the same functionality as that of system 5800 even without the light source 5815. However, this may require additional computer processing capabilities on board of the follower aircraft.

Alternatively, the system 5800 may be substituted with sound producing and receiving apparatus to achieve the same functionality. For example, the light source 5815 may be replaced with a directional sound emitter to produce a sound cone (e.g., using ultrasound frequencies), while the light detector 5825 may be replaced with a sound receiver. Changes in sound intensity or frequency may then reflect changes in the relative positions between the sound cone and the follower aircraft.

Figure 59:
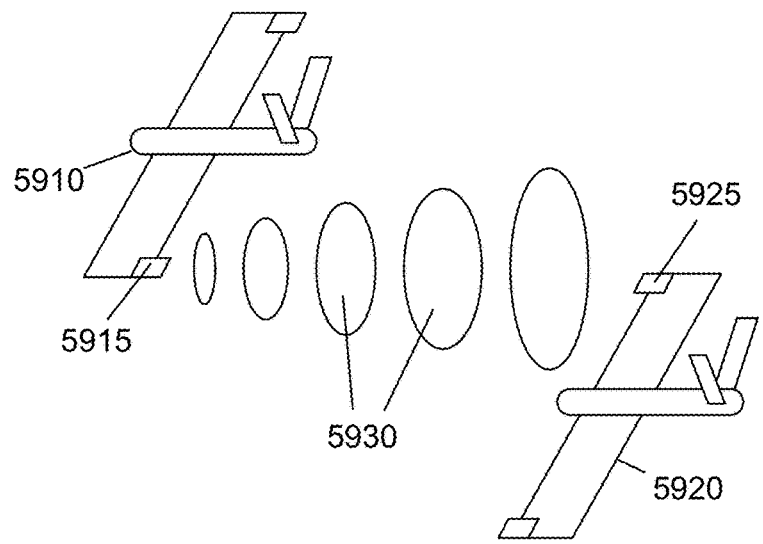
FIG. 59 shows another approach in accordance with at least some embodiments of the present invention that may facilitate vortex searching and coarse aligning for a close formation.

In accordance with embodiments of the present invention, FIG. 59 shows another system 5900 that may facilitate vortex searching and coarse aligning for a close formation. In system 5900 a leader aircraft 5910 may be equipped with a particle emitter 5915, which may be used to produce a thin trail 5930 of small particles (e.g., smoke) behind its wingtips. The trail 5930 may be identified by onboard cameras 5925 of a follower aircraft 5920. The trail 5930 may better reflect the path of wingtip vortices in comparison to light or sound beams.

Figure 60:
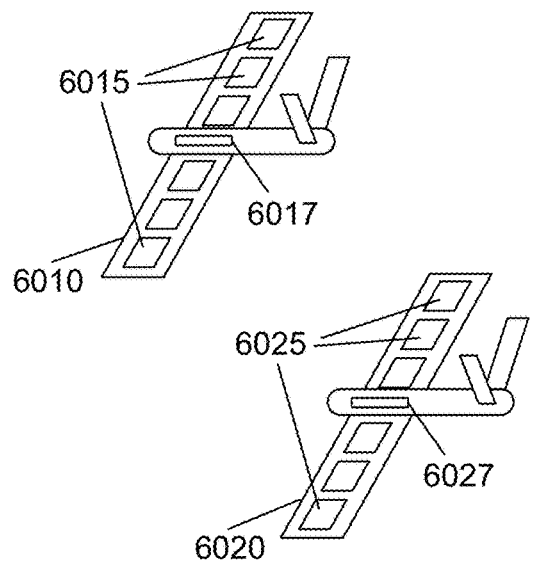
FIG. 60 shows another approach that may facilitate close formation flight in accordance with at least some embodiments of the present invention.

In accordance with embodiments of the present invention, FIG. 60 shows another system 6000 that may facilitate close formation flight. In system 6000 an aircraft 6010 and optionally an aircraft 6020 may each contain a plurality of radio antennas 6015 and 6025, respectively. These antennas may be operated as phase coherent arrays by onboard radio processing systems 6017 and 6027 respectively disposed on each aircraft 6010 and 6020. An antenna array (antennas 6015 or 6025) may link a particular aircraft to other aircraft, to ground-based network nodes (e.g., ground stations) or to space-based network nodes (e.g., communication satellites). Alternatively, it may provide a dedicated reference radio signal for relative position measurements by other aircraft. Such a signal may be directional and concentrated in some directions, for example in the plane of a flight formation. Spatial selectivity and channel propagation characteristics may be further improved by receiving or transmitting with phase coherence across multiple planes in the formation.

Changes in the relative phase delay between any two antennas from a given array (e.g., array 6015 or array 6025) will then provide information about changes in the relative positions of the corresponding points on planes in the formation. For example, these measurements of relative phase delays may provide estimates of relative positions between the planes (e.g., 6010 and 6020) along the Y and Z axes, as well as their relative angular orientation including pitch, roll and yaw angles. These phase delays may be measured by antennas that are used primarily for communications, or antennas dedicated for formation flight position measurements, or antennas used for both purposes within different frequency bands. If phase measurements are sufficiently accurate, they may also provide data about bending and other distortions of wing surfaces useful for aerodynamic optimization of formation flight with the help of Kalman filters, neural networks or deep learning algorithms, or any of the many other measurement and control methods described above. These measurements may provide on-board flight controllers with additional flight data to assist in coarse and fine alignment for the formation flight.

Figure 61:
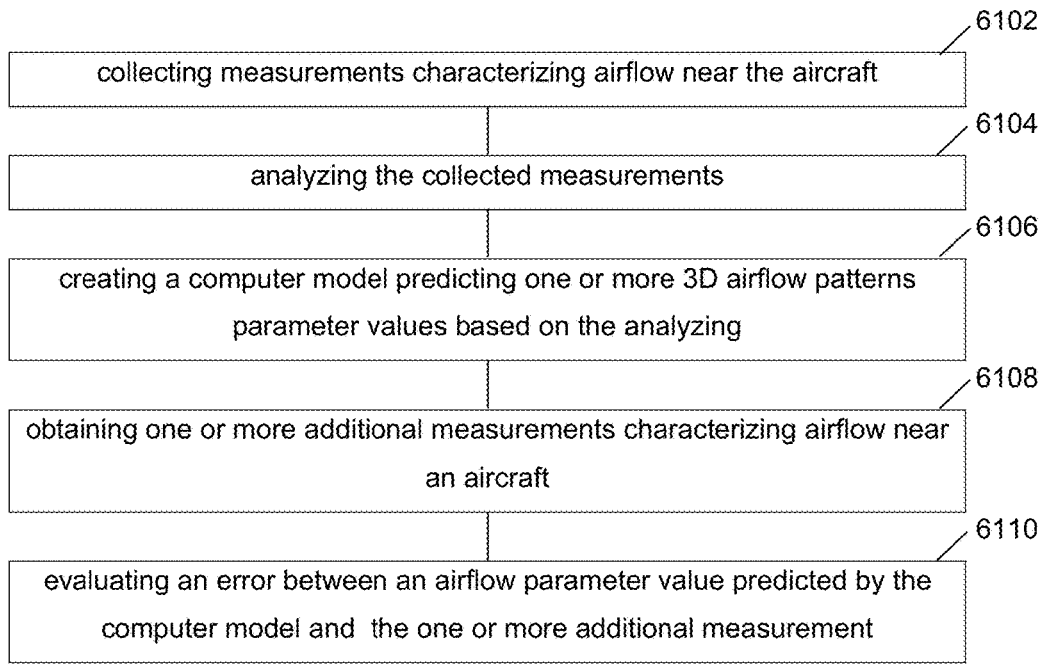
FIG. 61 shows a method of sensing three dimensional airflow by an aircraft in accordance with at least some embodiments of the present invention.

FIG. 61 shows a method 6100 of sensing three dimensional airflow by an aircraft in accordance with at least some embodiments of the present invention. The method 6100 includes collecting measurements characterizing airflow near the aircraft at 6102, analyzing the collected measurements at 6104, creating, by a processor, a computer model predicting one or more 3D airflow patterns parameter values based on the analyzing at 6106, obtaining one or more additional measurements characterizing airflow near an aircraft of the plurality of aircraft at 6108, and evaluating an error between an airflow parameter value predicted by the computer model and the one or more additional measurement at 6110.

In some embodiments, measurements collected during the collecting at 6102 include at least one of airflow velocity, airflow speed, airflow direction, air pressure, air temperature, or an aircraft angle of attack of the aircraft. In the same or other embodiments, at least some measurements collected during the collecting at 6102 may be derived from flight control signals applied to one or more control surfaces of the aircraft. In some embodiments, method 6100 includes varying at least one flight parameter of the aircraft prior to obtaining at least one measurement of the one or more additional measurements. The at least one flight parameter may include at least one of an aircraft angle of attack, heading, altitude or velocity. The computer model created during the creating at 6106 may be a 3D model of a vortex field.

Figure 62:
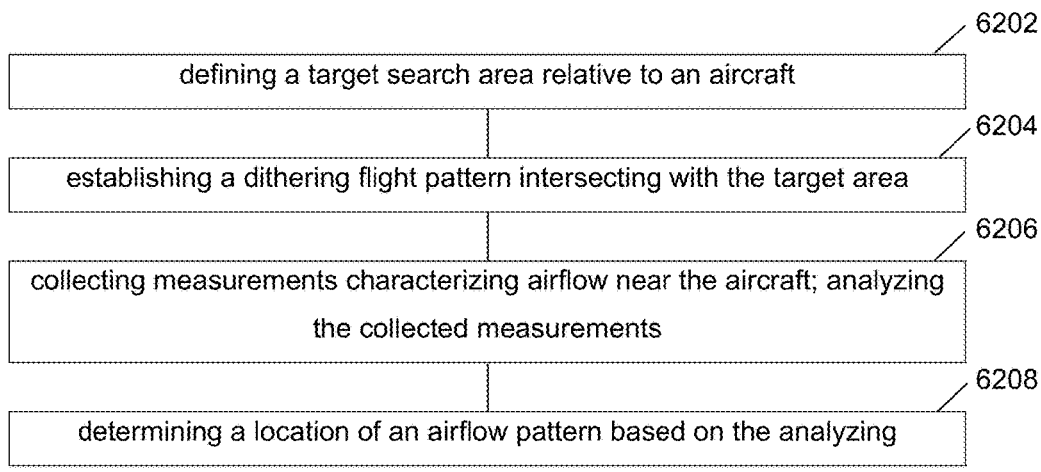
FIG. 62 shows a method of searching for an airflow pattern by an aircraft in accordance with at least some embodiments of the present invention.

FIG. 62 shows a method 6200 of searching for an airflow pattern by an aircraft in accordance with at least some embodiments of the present invention. The method 6200 includes defining a target search area relative to an aircraft at 6202, establishing a dithering flight pattern intersecting with the target area at 6204, collecting, measurements characterizing airflow near the aircraft at 6206, analyzing the collected measurements at 6208, and determining a location of an airflow pattern based on the analyzing at 6210. In some embodiments, at least some measurements collected during the collecting are derived from flight control signals applied to one or more control surfaces of the aircraft. In some embodiments, the target search area is defined at 6202 is defined with respect to a second aircraft.

In some embodiments, the determining at 6210 comprises performing continuous vortex sensing using a plurality of airflow sensors distributed along a spanwise direction of an aircraft wing and positioned on stand-off booms in front of a leading edge of the aircraft wing. In some embodiments, the determining at 6210 comprises performing continuous vortex sensing using a plurality of airflow sensors distributed along a spanwise direction of an aircraft wing and positioned on stand-off booms in front of a leading edge of the aircraft wing, and in some embodiments, the determining at 6210 comprises performing continuous vortex sensing using an airflow sensor on at least one of a fuselage of the aircraft, a tail of the aircraft, a tail of the aircraft, and a nose of the aircraft.

In some embodiments, establishing the dithering pattern at 6204 comprises varying at least one flight parameter of the aircraft relative to a second aircraft during the collecting.

Figure 63:
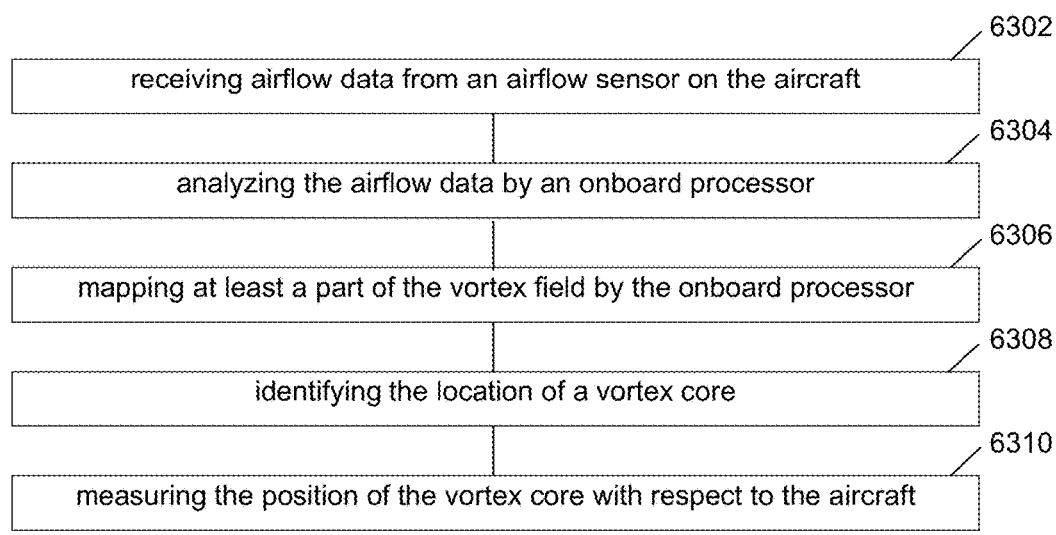
FIG. 63 shows a method of vortex tracking by an aircraft in accordance with at least some embodiments of the present invention.

FIG. 63 shows a method 6300 of vortex tracking by an aircraft in accordance with at least some embodiments of the present invention. The method 6300 includes receiving airflow data from an airflow sensor on the aircraft at 6302, analyzing the airflow data by an onboard processor at 6304, mapping at least a part of the vortex field by the onboard processor at 6206, identifying the location of a vortex core at 6208, and measuring the position of the vortex core with respect to the aircraft at 6210. In some embodiments, method 6300 further includes subdividing the vortex field into different vortex regions and identifying locations of respective vortex cores.

Figure 64:
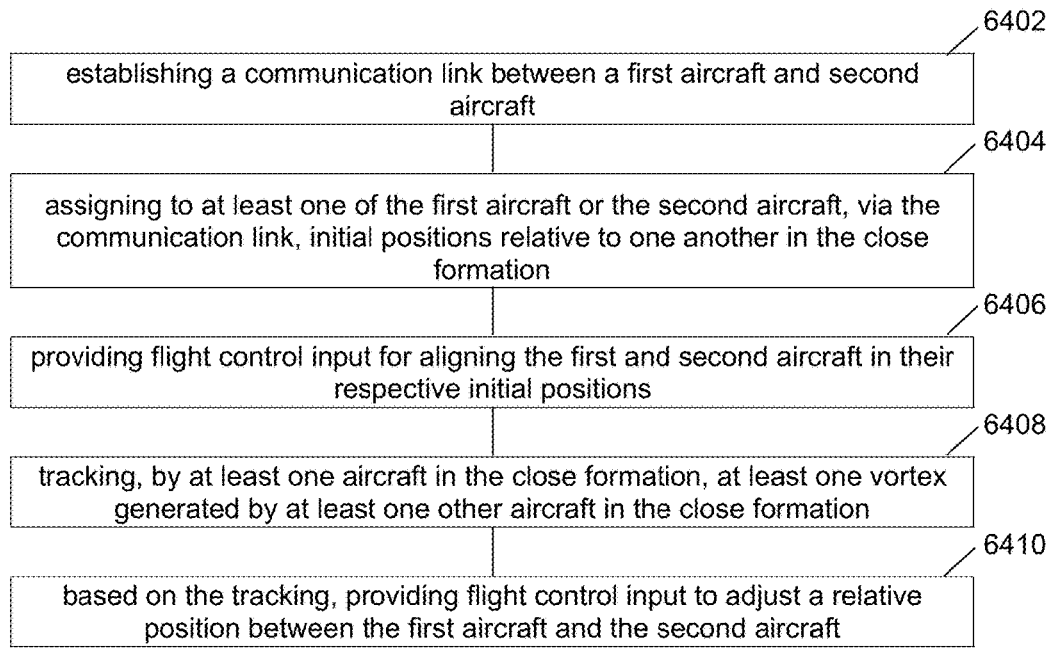
FIG. 64 shows a method of operating aircraft for flight in close formation in accordance with at least some embodiments of the present invention.

FIG. 64 shows a method 6400 of operating aircraft for flight in close formation in accordance with at least some embodiments of the present invention. The method 6400 includes establishing a communication link between a first aircraft and a second aircraft at 6402, assigning to at least one of the first aircraft or the second aircraft, via the communication link at initial positions relative to one another in the close formation at 6404, providing flight control input for aligning the first and second aircraft in their respective initial positions at 6406, tracking, by at least one aircraft in the close formation, at least one vortex generated by at least one other aircraft in the close formation at 6408, and based on the tracking, providing flight control input to adjust a relative position between the first aircraft and the second aircraft at 6410. In some embodiments, method 6400 further includes designating the roles of leader and follower to one or both of the first and second aircraft, selecting the formation pattern, shape and size for a formation, configuring flight control systems for a formation flight, and configuring payload for formation flight on at least one aircraft.

In some embodiments, the tracking at 6408 includes collecting airflow measurements, at the second aircraft, for sensing a first vortex generated by a wingtip of the first aircraft. The collected measurements may include at least one of airflow velocity vector, airflow speed, airflow direction, air pressure, air temperature, or an aircraft angle of attack of the second aircraft.

In some embodiments, the flight control input provided at 6406 includes changing one of an aircraft heading, altitude, roll, pitch, yaw, thrust or velocity. In some embodiments, method 6400 includes at least one of evaluating formation flight parameters and optimizing aircraft positions to maximize formation flight benefits based on the evaluation and/or establishing a data exchange network between the aircraft and exchanging telemetry data.

In some embodiments, method 6400 further includes at least one of producing a model of a vortex field by an on-board processor, preserving the model of the vortex field in a memory of the processor, initiating a vortex search, reacquiring a vortex pattern, updating the vortex model and/or providing continuous updates for vortex model characteristics on at least one aircraft. In some embodiment, method 6400 may further include navigating the formation as a whole to a destination position by the first aircraft. The tracking may be provided by the second aircraft and may further include defining a first target search area relative to the first aircraft, establishing, for the second aircraft, a dithering flight pattern intersecting with the first target search area, collecting, at the second aircraft, measurements characterizing airflow near the second aircraft, and determining a location of a first vortex by analyzing measurements collected at the second aircraft.

In some embodiments, method 6400 may include determining a location of a core of the at least one vortex, evaluating a displacement between the core of a first vortex and the second aircraft, changing a position of at least one of the first aircraft or the second aircraft and repeating the determining and evaluating until a desired displacement is achieved. In an embodiment, at least one of a transverse position, lateral position and vertical position of the second aircraft is changed with respect to the core of a vortex or the cores of multiple vortices.

In some embodiments, method 6400 further includes marking an approximate position of the at least one vortex. The marking may comprise emitting one or more of a stream of small particulates, ionized gas, radio waves, sound waves, and/or optical beams along a streamwise direction behind one or more wingtips of aircraft in the close formation.

Figure 65:
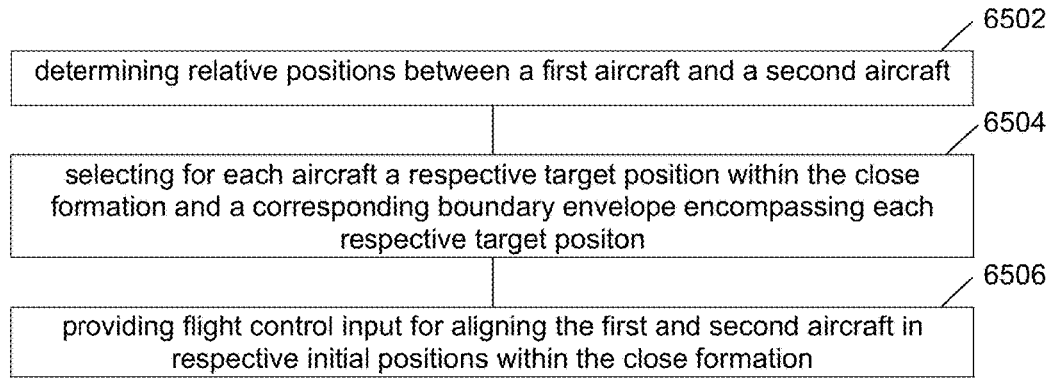
FIG. 65 shows a method of operating aircraft in a close formation flight in accordance within one or more embodiments of the present invention.

FIG. 65 shows a method 6500 of operating aircraft in a close formation flight in accordance within one or more embodiments of the present invention. The method 6500 comprises determining relative positions between a first aircraft and a second aircraft at 6502, selecting, for each aircraft, a respective target position within the close formation and a corresponding boundary envelope encompassing each respective target position at 6504, and providing flight control input for aligning the first and second aircraft in respective initial positions within the close formation at 6506.

Figure 66:
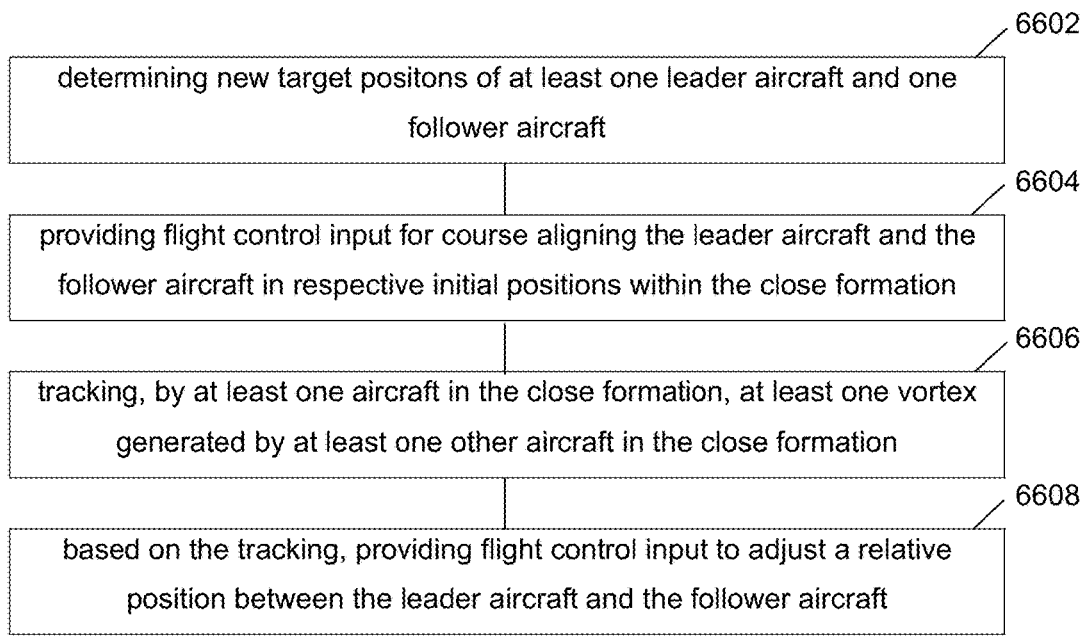
FIG. 66 shows a method of changing positions of at least two aircraft in a close formation flight in accordance with one or more embodiments of the present invention.

FIG. 66 shows a method 6600 of changing positions of at least two aircraft in a close formation flight in accordance with one or more embodiments of the present invention. The method 6600 comprises determining new target positions of at least leader aircraft one follower aircraft at 6602, providing flight control input for course aligning the leader aircraft and the follower aircraft in respective initial positions within the close formation at 6604, tracking, by at least one aircraft in the close formation, at least one vortex generated by at least one other aircraft in the close formation at 6606, and based on the tracking, providing flight control input to adjust a relative position between the leader aircraft and the follower aircraft at 6608.

Figure 67:
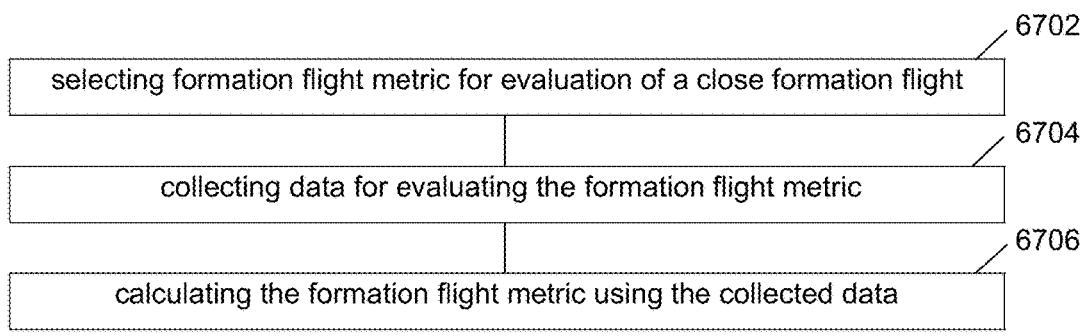
FIG. 67 shows a method for metric evaluation of a close formation between a leader aircraft and a follower aircraft.

FIG. 67 shows a method 6700 for metric evaluation of a close formation between a leader aircraft and a follower aircraft. The method 6700 includes selecting a formation flight metric for evaluation of a close formation flight at 6702, collecting data for evaluating the metric at 6704, and calculating the metric using collected data at 6706.

While the foregoing is directed to embodiments of the present invention, other and further embodiments of the invention may be devised without departing from the basic scope thereof.

The invention claimed is:

1. A method for establishing situational awareness during formation flight, comprising:
    establishing two-way communication links between at least two aircraft for exchanging at least telemetry data between the at least two aircraft;
    determining relative target positions for the at least two aircraft based on at least one flight metric;
    providing first flight control inputs to at least one of the at least two aircraft to establish the relative target positions;
    tracking, by at least one of the at least two aircraft, the at least one flight metric; and
    providing second flight control inputs to at least one of the at least two aircraft to adjust the relative target positions based on results of the tracking, wherein the second flight control inputs maintain an alteration to a position of the at least one of the at least two aircraft established by the first flight control inputs if an effect on the flight metric is positive and wherein the second flight control inputs reverse an alteration to a position of the at least one of the at least two aircraft established by the first flight control inputs if an effect on the flight metric is negative.

2. The method of claim 1, further including exchanging flight plans and commands via the two-way communication links.

3. The method of claim 1, further including one of selecting a pattern, shape and size for a formation, configuring flight control systems for a formation flight, and configuring payload for formation flight on at least one aircraft.

4. The method of claim 1, further comprising establishing a communication network for exchange of data between the at least two aircraft.

5. The method of claim 4, wherein establishing a communication network includes selecting at least one network channel and a transmission protocol for exchanging at least one of flight plans or commands.

6. The method of claim 5, wherein the selecting comprises selecting a peer-to-peer protocol.

7. The method of claim 4, wherein the communication network is established using one of free space optics and radio frequency (RF) communications.

8. The method of claim 4, wherein the communication network is extended to elements outside of a formation, including at least one of other aircraft, ground-based network nodes and space-based network nodes.

9. The method of claim 1, further including dividing flight control tasks between the at least two aircraft, in which a first aircraft is tasked with navigating the formation as a whole and a second aircraft is tasked with maintaining a formation pattern with the first aircraft.

10. The method of claim 1, further including designating, via a communication network, a first aircraft in a close formation as a network controller node for managing an exchange of data among aircraft via the communication network.

11. The method of claim 1, further including using an on-board airflow sensor for measuring and characterizing a three-dimensional airflow by at least one aircraft.

12. The method of claim 11, wherein the on-board airflow sensor is one of a differential airflow sensor, hot film airflow sensor, hot wire airflow sensor, and vane airflow sensor.

13. The method of claim 1, further including using an on-board airflow sensor array distributed along an aircraft airframe for measuring and characterizing a three-dimensional airflow by at least one aircraft.

14. The method of claim 1, further including collecting flight status information from the at least two aircraft in a formation and comparing the collected flight status.

15. The method of claim 14, further including initiating a change in the formation if the at least one of the aircraft flight status reaches a predetermined critical level.

16. A method for metric evaluation and control of a close formation flight, including:
    selecting a formation flight metric for evaluation of a close formation flight between at least two aircraft;
    collecting data for evaluating the formation flight metric;
    calculating the formation flight metric using collected data;
    altering a flight parameter of at least one of the at least two aircraft, and evaluating an effect of the altered flight parameter on the formation flight metric; and
    providing flight control feedback responsive to the evaluation of the effect, wherein the flight control feedback corresponds to a control input for maintaining an alteration to the flight parameter if the effect on the formation flight metric is positive and wherein the flight control feedback corresponds to control input for reversing an alteration to the flight parameter if the effect on the formation flight metric is negative.

17. The method of claim 16, wherein the flight parameter is one of aircraft position, airspeed, pitch angle, roll angle, yaw angle, acceleration, thrust, power consumption, and payload power consumption.

18. The method of claim 16, wherein the receiving comprises receiving an instruction to continuously alter the flight parameter.

19. The method of claim 16, wherein the formation flight metric is one of lift, drag, thrust, power consumption, fuel consumption, electrical power supply current, angle of attack, rate of descent or ascent, air speed, rolling moment, yaw moment, pitching moment, and vortex core displacement.

20. The method of claim 16, further including at least one of measuring airflow characteristics around the follower aircraft, exchanging data between the aircraft, analyzing collected data, using averaging and filtering for analyzing collected or exchanged data, using Kalman filters for data analysis and formation flight metric calculations, providing data used in calculations to other aircraft, providing the calculated metric to other aircraft in a formation, using a second formation flight metric parameter, or selecting a different formation flight metric.

21. The method of claim 16, further including metric evaluation of a close formation between another pair of a leader and a follower aircraft in the same formation.

22. The method of claim 21, further including collecting and analyzing individual formation flight metric parameters from different followers and evaluating a combined formation flight metric to characterize the status of the formation as a whole.

23. The method of claim 22, further including receiving instructions to alter flight parameters of two of the aircraft, and evaluating an effect of altered flight parameter on the combined formation flight metric.

24. The method of claim 16, further including using a deep learning computer algorithm for data processing and analysis to identify a vortex pattern and record optimum follower aircraft position with respect to the vortex core.

25. The method of claim 24, further including identifying previously identified vortex pattern and using flight control inputs to set a recorded optimum follower aircraft position with respect to the vortex core.

26. The method of claim 16, further including using a deep learning computer algorithm for data processing and analysis to identify a vortex pattern and record optimum follower aircraft position with respect to the leader aircraft.

* * * * *